US008963890B2

(12) United States Patent
Raif et al.

(10) Patent No.: US 8,963,890 B2
(45) **Date of Patent: *Feb. 24, 2015**

(54) METHOD AND SYSTEM FOR DIGITAL PEN ASSEMBLY

(75) Inventors: Ran Raif, Tel-Aviv (IL); Noam Kedem, Moshav Lahish (IL); Michael Kokarev, Haifa (IL); Max Gotman, Kfar-Saba (IL); Nathan Altman, RaAnana (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/329,361

(22) Filed: Dec. 19, 2011

(65) Prior Publication Data

US 2012/0086675 A1 Apr. 12, 2012

Related U.S. Application Data

(63) Continuation of application No. 11/884,894, filed as application No. PCT/IL2006/000373 on Mar. 23, 2006, now Pat. No. 8,248,389.

(60) Provisional application No. 60/664,202, filed on Mar. 23, 2005.

(51) Int. Cl.

| | |
|---|---|
| ***G09G 5/00*** | (2006.01) |
| ***G06F 3/033*** | (2013.01) |
| ***G06F 3/043*** | (2006.01) |
| ***G06F 3/0354*** | (2013.01) |

(52) U.S. Cl.
CPC ............ *G06F 3/043* (2013.01); *G06F 3/03545* (2013.01)
USPC .......................................... 345/179; 345/156

(58) Field of Classification Search
CPC ............................ G06F 3/043; G06F 3/03545
USPC ............ 345/156–163, 184; 200/51 R, 51–16, 200/61–78, 519, 520, 529, 530–532, 553
See application file for complete search history.

(56) References Cited

U.S. PATENT DOCUMENTS 2,567,407 A 9/1951 Slaymaker
4,183,011 A 1/1980 Massa
4,211,489 A 7/1980 Kleinknecht et al.
4,271,490 A 6/1981 Minohara et al.

(Continued)

FOREIGN PATENT DOCUMENTS

CN 26122094 4/2004
DE 19701344 7/1997

(Continued)

OTHER PUBLICATIONS

Examination Report Dated Jan. 6, 2012 From the Intellectual Property Office of New Zealand Re. Application No. 597258.

(Continued)

*Primary Examiner* — Jonathan Horner
(74) *Attorney, Agent, or Firm* — Haynes and Boone, LLP

(57) ABSTRACT

A digital pen comprising: an electric circuit, an acoustic transmitter, detached from the electric circuit, and configured to transmit acoustic signals, and a resilient holder, configured to mechanically press the electric circuit into electrical contact with the transmitter, so as to electrically connect the electric circuit and the transmitter.

39 Claims, 30 Drawing Sheets
(13 of 30 Drawing Sheet(s) Filed in Color)

240
250
210
220
2000

(56) References Cited

U.S. PATENT DOCUMENTS

| | | | |
|---|---|---|---|
| 4,297,607 | A | 10/1981 | Lynnworth et al. |
| 4,433,399 | A | 2/1984 | Massa |
| 4,501,186 | A | 2/1985 | Ikuma |
| 4,554,834 | A | 11/1985 | Prinz et al. |
| 4,576,047 | A | 3/1986 | Lauer et al. |
| 4,577,506 | A | 3/1986 | Poole et al. |
| 4,630,072 | A | 12/1986 | Scardovi et al. |
| 4,641,291 | A | 2/1987 | Simmons, Sr. et al. |
| 4,672,592 | A | 6/1987 | Skinner |
| 4,758,691 | A | 7/1988 | De Bruyne |
| 4,814,552 | A | 3/1989 | Stefik et al. |
| 4,855,961 | A | 8/1989 | Jaffe et al. |
| 4,991,148 | A | 2/1991 | Gilchrist |
| 5,062,089 | A | 10/1991 | Willard et al. |
| 5,138,159 | A | 8/1992 | Takase et al. |
| 5,142,506 | A | 8/1992 | Edwards |
| 5,245,863 | A | 9/1993 | Kajimura et al. |
| 5,339,259 | A | 8/1994 | Puma et al. |
| 5,372,138 | A | 12/1994 | Crawley et al. |
| 5,391,197 | A | 2/1995 | Burdette et al. |
| 5,394,741 | A | 3/1995 | Kajimura et al. |
| 5,402,150 | A | 3/1995 | Stiles |
| 5,421,338 | A | 6/1995 | Crowley et al. |
| 5,432,346 | A | 7/1995 | Nose et al. |
| 5,511,043 | A | 4/1996 | Lindberg |
| 5,515,853 | A | 5/1996 | Smith et al. |
| 5,517,579 | A | 5/1996 | Baron et al. |
| 5,519,686 | A | 5/1996 | Yanagisawa et al. |
| 5,524,630 | A | 6/1996 | Crowley |
| 5,530,683 | A | 6/1996 | Lindberg |
| 5,550,791 | A | 8/1996 | Peloquin |
| 5,557,301 | A | 9/1996 | D'Aviau de Piolant |
| 5,588,432 | A | 12/1996 | Crowley |
| 5,682,445 | A | 10/1997 | Smith |
| 5,691,580 | A | 11/1997 | Shelby |
| 5,702,629 | A | 12/1997 | Cui et al. |
| 5,715,825 | A | 2/1998 | Crowley |
| 5,717,427 | A | 2/1998 | Lin |
| 5,721,721 | A | 2/1998 | Yanagisava et al. |
| 5,750,941 | A | 5/1998 | Ishikawa et al. |
| 5,781,661 | A | 7/1998 | Hiraiwa et al. |
| 5,840,031 | A | 11/1998 | Crowley et al. |
| 5,864,098 | A | 1/1999 | Shinohe |
| 5,866,856 | A | 2/1999 | Holtzman |
| 5,867,146 | A | 2/1999 | Kim et al. |
| 5,913,629 | A | 6/1999 | Hazzard |
| 5,977,958 | A | 11/1999 | Baron et al. |
| 6,002,387 | A | 12/1999 | Ronkka et al. |
| 6,004,269 | A | 12/1999 | Crowley et al. |
| 6,018,849 | A | 2/2000 | Royer |
| 6,111,565 | A | 8/2000 | Chery et al. |
| 6,137,621 | A | 10/2000 | Wu |
| 6,147,681 | A | 11/2000 | Chery et al. |
| 6,151,014 | A | 11/2000 | Zloter et al. |
| 6,169,281 | B1 | 1/2001 | Chen et al. |
| 6,184,873 | B1 | 2/2001 | Ward et al. |
| 6,211,863 | B1 | 4/2001 | Chery et al. |
| 6,232,962 | B1 | 5/2001 | Davis et al. |
| 6,252,656 | B1 | 6/2001 | Wu et al. |
| 6,265,676 | B1 | 7/2001 | Zloter et al. |
| 6,282,340 | B1 | 8/2001 | Nasu et al. |
| 6,292,177 | B1 | 9/2001 | Zloter et al. |
| 6,292,180 | B1 | 9/2001 | Lee |
| 6,300,580 | B1 | 10/2001 | Shenholtz et al. |
| 6,307,956 | B1 | 10/2001 | Black |
| 6,324,292 | B1 | 11/2001 | Mitsuhashi et al. |
| 6,367,335 | B1 | 4/2002 | Hicks |
| 6,392,230 | B1 | 5/2002 | Aita |
| 6,392,330 | B1 | 5/2002 | Zloter et al. |
| 6,404,703 | B1 | 6/2002 | Burrell |
| 6,424,340 | B1 | 7/2002 | Holtzman et al. |
| 6,430,342 | B1 | 8/2002 | Kim et al. |
| 6,485,413 | B1 | 11/2002 | Boppart et al. |
| 6,491,408 | B1 | 12/2002 | Cooper et al. |
| 6,504,289 | B2 | 1/2003 | Toda et al. |
| 6,577,299 | B1 | 6/2003 | Schiller et al. |
| 6,594,369 | B1 | 7/2003 | Une |
| 6,654,008 | B2 | 11/2003 | Ikeda et al. |
| 6,681,635 | B1 | 1/2004 | Van Schaik |
| 6,703,570 | B1 | 3/2004 | Russell et al. |
| 6,724,371 | B1 | 4/2004 | Shenholtz et al. |
| 6,727,439 | B2 | 4/2004 | Chao et al. |
| 6,738,408 | B2 | 5/2004 | Abedin |
| 6,739,780 | B1 | 5/2004 | Kuo |
| 6,745,632 | B1 | 6/2004 | Dryer et al. |
| 6,771,006 | B2 | 8/2004 | Zloter et al. |
| 6,778,735 | B2 | 8/2004 | Miller et al. |
| 6,798,403 | B2 | 9/2004 | Kitada et al. |
| 6,806,867 | B1 | 10/2004 | Arruda et al. |
| 6,816,266 | B2 | 11/2004 | Varshneya et al. |
| 6,822,641 | B2 | 11/2004 | Shenholtz et al. |
| 6,823,105 | B2 | 11/2004 | Zloter et al. |
| 6,831,781 | B2 | 12/2004 | Tearney et al. |
| 6,841,742 | B2 | 1/2005 | Shenholtz et al. |
| 6,873,415 | B2 | 3/2005 | Amonette et al. |
| 6,876,356 | B2 | 4/2005 | Zloter et al. |
| 7,113,173 | B1 | 9/2006 | Bi et al. |
| 7,166,910 | B2 | 1/2007 | Minervini |
| 7,336,262 | B2 | 2/2008 | Tsuji |
| 2001/0012002 | A1 | 8/2001 | Tosaya |
| 2001/0020936 | A1 | 9/2001 | Tsuji |
| 2002/0031243 | A1 | 3/2002 | Schiller et al. |
| 2002/0060665 | A1 | 5/2002 | Sekiguchi et al. |
| 2002/0113778 | A1 | 8/2002 | Rekimoto et al. |
| 2002/0140673 | A1 | 10/2002 | Tanaka |
| 2002/0176577 | A1 | 11/2002 | Xu |
| 2003/0029707 | A1 | 2/2003 | Gillman et al. |
| 2003/0095708 | A1 | 5/2003 | Pittel |
| 2003/0112623 | A1 | 6/2003 | Yu et al. |
| 2003/0142065 | A1 | 7/2003 | Pahlavan |
| 2003/0151596 | A1 | 8/2003 | Moyne et al. |
| 2003/0221876 | A1 | 12/2003 | Doczy et al. |
| 2004/0000838 | A1 * | 1/2004 | Toda ............................ 310/311 |
| 2004/0032399 | A1 | 2/2004 | Sekiguchi et al. |
| 2004/0133366 | A1 | 7/2004 | Sullivan et al. |
| 2004/0169439 | A1 * | 9/2004 | Toda ............................ 310/328 |
| 2005/0030297 | A1 | 2/2005 | Burstrom et al. |
| 2005/0077102 | A1 | 4/2005 | Banter et al. |
| 2005/0150697 | A1 | 7/2005 | Altman et al. |
| 2006/0166362 | A1 | 7/2006 | Dezawa et al. |
| 2007/0189568 | A1 | 8/2007 | Wilk et al. |
| 2008/0084789 | A1 | 4/2008 | Altman |
| 2008/0166048 | A1 | 7/2008 | Raif et al. |
| 2011/0096042 | A1 | 4/2011 | Raif et al. |
| 2011/0096043 | A1 | 4/2011 | Raif et al. |
| 2011/0096044 | A1 | 4/2011 | Raif et al. |

FOREIGN PATENT DOCUMENTS

| | | |
|---|---|---|
| EP | 0312481 | 4/1989 |
| EP | 0666543 | 8/1995 |
| EP | 1450296 | 8/2004 |
| EP | 1504330 | 8/2006 |
| EP | 1755360 | 2/2007 |
| GB | 2043899 | 10/1980 |
| GB | 2121174 | 12/1983 |
| JP | 53-117466 | 10/1978 |
| JP | 57-108769 | 7/1982 |
| JP | S61109177 A | 5/1986 |
| JP | 61-176331 | 8/1986 |
| JP | S62147032 U | 9/1987 |
| JP | 63-106585 | 5/1988 |
| JP | 01-046672 | 2/1989 |
| JP | 07-255764 | 10/1995 |
| JP | 07-287632 | 10/1995 |
| JP | 08-129446 | 5/1996 |
| JP | 08-321670 | 12/1996 |
| JP | 09-243343 | 9/1997 |
| JP | 09-305306 | 11/1997 |
| JP | 11-237950 | 8/1999 |
| JP | 2000-125387 | 4/2000 |
| JP | 2001-042888 | 2/2001 |
| JP | 2001-054196 | 2/2001 |
| JP | 2001-245394 | 9/2001 |

(56) References Cited

FOREIGN PATENT DOCUMENTS

| | | |
|---|---|---|
| JP | 2001-518209 | 10/2001 |
| JP | 2002-091472 | 3/2002 |
| JP | 2002-132436 | 5/2002 |
| JP | 2003019897 A | 1/2003 |
| JP | 2004-070887 | 3/2004 |
| JP | 2004-164505 | 6/2004 |
| JP | 2005-174190 | 6/2005 |
| JP | 2005-518657 | 6/2005 |
| JP | 2005-183437 | 7/2005 |
| JP | 2007-060661 | 3/2007 |
| JP | 2007-104582 | 4/2007 |
| KR | 1997-60988 | 8/1997 |
| KR | 2004009625 | 1/2004 |
| KR | 20040006769 | 1/2004 |
| KR | 1020040006769 | 1/2004 |
| KR | 1020040009625 | 1/2004 |
| TW | 394833 | 6/2000 |
| TW | 235010 | 6/2005 |
| WO | WO 97/33145 | 9/1997 |
| WO | WO 00/13039 | 3/2000 |
| WO | WO 00/21020 | 4/2000 |
| WO | WO 00/21203 | 4/2000 |
| WO | WO 01/35329 | 5/2001 |
| WO | WO 02/01466 | 1/2002 |
| WO | WO 03/001358 | 1/2003 |
| WO | WO 03/027643 | 4/2003 |
| WO | WO 03/069547 | 8/2003 |
| WO | WO 03/088136 | 10/2003 |
| WO | WO 2004/010592 | 1/2004 |
| WO | 2005072262 A2 | 8/2005 |
| WO | WO 2005/111653 | 11/2005 |
| WO | WO 2006/100682 | 9/2006 |
| WO | WO 2007/004119 | 1/2007 |
| WO | WO 2008/111011 | 9/2008 |

OTHER PUBLICATIONS

Restriction Official Action Dated Jan. 25, 2012 From the US Patent and Trademark Office Re. U.S. Appl. No. 12/984,617.
Communication Pursuant to Article 94(3) EPC Dated Jan. 25, 2012 From the European Patent Office Re. Application No. 11156827.5.
Translation of Official Query Dated Feb. 24, 2012 From the Japanese Patent Office Re. Application No. 2007-517644.
Examination Report Dated Jun. 5, 2012 From the Intellectual Property Office of New Zealand Re. Application No. 580288.
Office Action Dated May 30, 2012 From the Israel Patent Office Re. Application No. 200938 and Its Translation Into English.
Requisition by the Examiner Dated May 25, 2012 From the Canadian Intellectual Property Office Re. Application No. 2,566,534.
Office Action Dated Mar. 27, 2012 From the Israel Patent Office Re. Application No. 186083 and Its Translation Into English.
Official Action Dated May 3, 2012 From the US Patent and Trademark Office Re. U.S. Appl. No. 12/984,618.
Notice of Allowance Dated May 16, 2012 From the US Patent and Trademark Office Re.: U.S. Appl. No. 11/884,894.
Restriction Official Action Dated May 25, 2012 From the US Patent and Trademark Office Re. U.S. Appl. No. 12/531,075.
Translation of Official Decision of Rejection Dated May 15, 2012 From the Japanese Patent Office Re. Application No. 2009-553264.
Examination Report Dated Sep. 26, 2008 From the Government of India, Patent Office Re.: Application No. 2344/CHENP/2004.
Examiner's Report Dated Oct. 30, 2008 From the Australian Government, IP Australia Re.: Application No. 2005243022.
International Preliminary Report on Patentability Dated Mar. 14, 2007 From the International Preliminary Examining Authority Re.: Application No. PCT/IL2005/000509.
International Preliminary Report on Patentability Dated Aug. 27, 2007 From the International Preliminary Examining Authority Re.: Application No. PCT/IL2006/000373.
Official Action Dated Feb. 10, 2009 From the US Patent and Trademark Office Re.: U.S. Appl. No. 10/510,228.
Official Action Dated Jul. 10, 2008 From the US Patent and Trademark Office Re.: U.S. Appl. No. 10/510,228.
Claims and Observations in Response Dated May 30, 2011 to Summons to Attend Oral Proceedings Pursuant to Rule 115(1) EPC of Mar. 3, 2011 From the European Patent Office Re.: Application No. 06728180.8.
Communication Pursuant to Article 94(3) EPC Dated Mar. 6, 2009 From the European Patent Office Re.: Application No. 06728180.8.
Communication Pursuant to Article 94(3) EPC Dated Jan. 8, 2010 From the European Patent Office Re.: Application No. 08719694.5.
Communication Pursuant to Article 94(3) EPC Dated Sep. 10, 2009 From the European Patent Office Re.: Application No. 06728180.8.
Communication Pursuant to Article 94(3) EPC Dated Jul. 14, 2010 From the European Patent Office Re. Application No. 06728180.8.
Communication Pursuant to Article 94(3) EPC Dated Jul. 26, 2011 From the European Patent Office Re. Application No. 10162182.9.
Communication Pursuant to Article 94(3) EPC Dated Nov. 26, 2010 From the European Patent Office Re.: Application No. 08719694.5.
Communication Pursuant to Article 96(2) EPC Dated Nov. 18, 2005 From the European Patent Office Re.: Application No. 03811473.2.
Communication Pursuant to Rules 70(2) and 70a(2) EPC and Reference to Rule 39(1) EPC Dated Jan. 11, 2011 From the European Patent Office Re. Application No. 10162182.9.
Communication Pursuant to Rules 70(2) and 70a(2) EPC and References to Rule 39(1) EPC Dated Jul. 18, 2011 From the European Patent Office Re. Application No. 11156827.5.
Communication Relating to the Results of the Partial International Search Report Dated Sep. 18, 2008 From the International Searching Authority Re.: Application No. PCT/IB2008/050946.
European Search Report and the European Search Opinion Dated Jun. 14, 2011 From the European Patent Office Re. Application No. 11156827.5.
European Search Report and the European Search Opinion Dated Nov. 29, 2010 From the European Patent Office Re. Application No. 10162182.9.
Examination Report Dated Sep. 6, 2006 From the Intellectual Property Office of New Zealand Re.: Application No. 535953.
Examination Report Dated Jul. 7, 2009 From the Intellectual Property Office of New Zealand Re.: Application No. 562665.
Examination Report Dated Oct. 12, 2005 From the Intellectual Property Office of New Zealand Re.: Application No. 535953.
Examination Report Dated Feb. 19, 2010 From the Intellectual Property Office of New Zealand Re.: Application No. 562665.
Examination Report Dated Feb. 28, 2011 From the Intellectual Property Office of New Zeal and Re. Application No. 580288.
Examination Report. Dated Jul. 29, 2009 From the Government of India, Patent Office Re.: Application No. 2344/CHENP/2004.
Examiner's Report Dated May 3, 2010 From the Australian Government, IP Australia Re.: Application No. 2006225986.
Examiner's Report Dated Dec. 14, 2007 From the Australian Government, IP Australia Re.: Application No. 2003219506.
Examiner's Report Dated Feb. 16, 2011 From the Australian Government, IP Australia Re. Application No. 2008224542.
Examiner's Report Dated Jun. 27, 2011 From the Australian Government, IP Australia Re. Application No. 2006225986.
First Written Opinion Dated Oct. 29, 2004 From the International Preliminary Examining Authority Re.: Application No. PCT/IL03/00309.
International Preliminary Examination Report Dated Apr. 26, 2005 From the International Preliminary Examining Authority Re.: Application No. PCT/IL03/00309.
International Preliminary Report on Patentability Dated Sep. 24, 2009 From the International Bureau of WIPO Re.: Application No. PCT/IB2008/050946.
International Search Report and the Written Opinion Dated Dec. 16, 2008 From the International Searching Authority Re.: Application No. PCT/IB2008/050946.
International Search Report Dated Aug. 2, 2006 From the International Searching Authority Re.: Application No. PCT/IL2005/000509.
International Search Report Dated Dec. 16, 2008 From the International Searching Authority Re.: Application No. PCT/IB2008/050946.

(56) References Cited

OTHER PUBLICATIONS

International Search Report Dated Apr. 18, 2007 From the International Searching Authority Re.: Application No. PCT/IL2006/000373.
International Search Report Dated Sep. 22, 2004 From the International Searching Authority Re. Application No. PCT/IL03/00309.
Invitation Pursuant to Rule 62a(1) EPC Dated Mar. 23, 2011 From the European Patent Office Re. Application No. 11156827.5.
Notice of Allowance Dated Aug. 5, 2010 From the US Patent and Trademark Office Re.: U.S. Appl. No. 11/596,625.
Notice of the Reason for Rejection Dated May 1, 2009 From the Korean Intellectual Property Office Re.: Applicaiton No. 2004-7016511 and Its Translation Into English.
Observations as Part of a Response Dated Jan. 3, 2011 to Communication Pursuant to Article 94(3) EPC of Jul. 14, 2010 From the European Patent Office Re. Application No. 06728180.8.
Office Action Dated Jun. 2, 2006 From the State Intellectual Property Office of the People's Republic of China Re.: Application No. 03813673.2.
Office Action Dated May 24, 2011 From the Israel Patent Office Re. Application No. 186083 and Its Translation Into English.
Official Action Dated Jun. 9, 2010 From the US Patent and Trademark Office Re.: U.S. Appl. No. 11/596,625.
Official Action Dated Jul. 10, 2008 From the United States Patent and Trademark Office Re:. U.S. Appl. No. 10/510,228.
Official Action Dated Aug. 11, 2011 From the US Patent and Trademark Office Re. U.S. Appl. No. 11/884,894.
Official Action Dated Jul. 14, 2009 From the US Patent and Trademark Office Re.: U.S. Appl. No. 10/510,228.
Official Action Dated Jan. 15, 2010 From the US Patent and Trademark Office Re.: U.S. Appl. No. 10/510,228.
Official Action Dated Dec. 17, 2010 From the US Patent and Trademark Office Re.: U.S. Appl. No. 10/510,228.
Official Action Dated Feb. 17, 2011 From the US Patent and Trademark Office Re. U.S. Appl. No. 11/884,894.
Official Action Dated Mar. 19, 2008 From the US Patent and Trademark Office Re.: U.S. Appl. No. 10/510,228.
Official Action Dated Feb. 22, 2010 From the US Patent and Trademark Office Re.: U.S. Appl. No. 11/596,625.
Official Action Dated May 23, 2011 From the US Patent and Trademark Office Re.: U.S. Appl. No. 11/884,894.
Official Action Dated Jun. 25, 2010 From the US Patent and Trademark Office Re.: U.S. Appl. No. 10/510,228.
Official Action Dated Nov. 26, 2007 From the US Patent and Trademark Office Re.: U.S. Appl. No. 10/510,228.
Official Decision of Rejection Dated Dec. 19, 2008 From the Japanese Patent Office Re.: Application No. 2003-584999 and Its Translation Into English.
Requisition by the Examiner Dated Jun. 3, 2011 From the Canadian Intellectual Property Office Re. Application No. 2,481,643.
Requisition by the Examiner Dated Sep. 7, 2010 From the Canadian Intellectual Property Office Re. Application No. 2,481,643.
Response Dated Jun. 2, 2010 to Official Action of Jan. 15, 2010 From the US Patent and Trademark Office Re.: U.S. Appl. No. 10/510,228.
Response Dated Aug. 3, 2011 to Examiner's Report of Jun. 27, 2011 From the Australian Government, IP Australia Re. Application No. 2006225986.
Response Dated Jul. 4, 2011 to the Communication Pursuant to Rules 70(2) and 70a(2) EPC and Reference to Rule 39(1) EPC of Jan. 11, 2011 From the European Patent Office Re. Application No. 10162182.9.
Response Dated Dec. 6, 2011 to Communication Pursuant to Article 94(3) EPC of Jul. 26, 2011 From the European Patent Office Re. Application No. 10162182.9.
Response Dated Jun. 8, 2011 to Examiner's Report of May 3, 2010 From the Australian Government, IP Australia Re.: Application No. 2006225986.
Response Dated Apr. 14, 2011 to Official Action of Dec. 17, 2010 From the US Patent and Trademark Office Re.: U.S. Appl. No. 10/510,228.
Response Dated Dec. 15, 2011 to Notice of Reason for Rejection of Oct. 4, 2011 From the Japanese Patent Office Re. Application No. 2008-502561.
Response Dated Sep. 15, 2011 to Official Action of Aug. 11, 2011 From the US Patent and Trademark Office Re. U.S. Appl. No. 11/884,894.
Response Dated Jan. 17, 2010 to Communication Pursuant to Article 94(3) EPC of Sep. 10, 2009 From the european Patent Office Re.: Application No. 06728180.8.
Response Dated Jan. 17, 2011 to Requisition by the Examiner of Sep. 7, 2010 From the Canadian Intellectual Property Office Re. Application No. 2,481,643.
Response Dated Mar. 17, 2011 to Official Action of Feb. 17, 2011 From the US Patent and Trademark Office Re. U.S. Appl. No. 11/884,894.
Response Dated Feb. 18, 2010 to Notice of Final Rejection of Dec. 9, 2009 From the Korean Intellectual Property Office Re.: Application No. 2004-7016511.
Response Dated Sep. 18, 2011 to Office Action of May 24, 2011 From the Israel Patent Office Re. Application No. 186083.
Response Dated Oct. 20, 2010 to Office Action of Jun. 9, 2010 From the State Intellectual Property Office of the People's Republic of China Re.: Application No. 200680017983.3.
Response Dated Apr. 22, 2010 to Communication Pursuant to Article 94(3) EPC of Jan. 8, 2010 From the European Patent Office Re.: Application No. 08719694.5.
Response Dated Jun. 22, 2011 to Official Action of May 23, 2011 From the US Patent and Trademark Office Re.: U.S. Appl. No. 11/884,894.
Response Dated Mar. 22, 2010 to Official Action of Feb. 22, 2010 From the US Patent and Trademark Office Re.: U.S. Appl. No. 11/596,625.
Response Dated Nov. 22, 2010 to Notice of Reason for Rejection of Sep. 10, 2010 From the Japanese Patent Office Re. Application No. 2007-517644.
Response Dated Jul. 26, 2010 to Examination Report of Feb. 19, 2010 From the Intellectual Property Office of New Zealand Re.: Application No. 562665.
Response Dated Jul. 26, 2010 to Official Action of Jun. 9, 2010 From the Its Patent and Trademark Office Re.: U.S. Appl. No. 11/596,625.
Response Dated Sep. 26, 2011 to Examinees Report of Feb. 16, 2011 From the Australian Government, IP Australia Re. Application No. 2008224542.
Response Dated Feb. 27, 2011 to Communication Pursuant to Article 94(3) EPC of Nov. 26, 2010 From the European Patent Office Re.: Application No. 08719694.5.
Response Dated Sep. 27, 2010 to Official Action of Jun. 25, 2010 From the US Patent and Trademark Office Re.: U.S. Appl. No. 10/510,228.
Response Dated Dec. 29, 2009 to Examination Report of Jul. 7, 2009 From the Intellectual Property Office of New Zealand Re.: Application No. 562665.
Response Dated Jun. 29, 2010 to Official Query of Apr. 20, 2010 From the Japanese Patent Office Re.: Application No. 2003-584999.
Response Dated Nov. 30, 2011 to Requisition by the Examiner of Jun. 3, 2011 From the Canadian Intellectual Property Office Re. Application No. 2,481,643.
Second Written Opinion Dated Dec. 27, 2004 From the International Preliminary Examining Authority Re.: Application No. PCT/IL03/00309.
Summons to Attend Oral Proceedings Pursuant to Rule 115(1) EPC Dated Mar. 3, 2011 From the European Patent Office Re.: Application No. 06728180.8.
Translation of Notice of Final Rejection Dated Dec. 9, 2009 From the Korean Intellectual Property Office Re.: Application No. 2004-7016511.
Translation of Notice of Reason for Rejection Dated May 2, 2008 From the Japanese Patent Office Re.: Application No. 2003-584999.
Translation of Notice of Reason for Rejection Dated Oct. 4, 2011 From the Japanese Patent Office Re. Application No. 2008-502561.
Translation of Notice of Reason for Rejection Dated Sep. 10, 2010 From the Japanese Patent Office Re. Application No. 2007-517644.

(56) References Cited

OTHER PUBLICATIONS

Translation of Notice of Reason for Rejection Dated Dec. 13, 2011 From the Japanese Patent Office Re. Application No. 2009-553264.
Translation of Notice of Reason for RejectionDated Nov. 25, 2011 From the Japanese Patent Office Re. Application No. 2009-101044.
Translation of Office Action Dated Jan. 9, 2009 From the State Intellectual Property Office of the People' Republic of China Re.: Application No. 200680017983.3.
Translation of Office Action Dated Jun. 9, 2010 From the State Intellectual Property Office of the People's Republic of China Re.: Application No. 200680017983.3.
Translation of Office Action Dated Feb. 13, 2009 From the State Intellectual Property Office of the People's Republic of China Re.: Application No. 200580023798.0.
Translation of Office Action Dated Jul. 17, 2009 From the State Intellectual Property Office of the People's Republic of China Re.: Application No. 200680017983.3.
Translation of Office Action Dated Oct. 31, 2008 From the Patent Office of the People's Republic of China Re.: Application No. 200580023798.0.
Translation of Official Decision of Rejection Dated Apr. 19, 2011 From the Japanese Patent Office Re. Application No. 2007-517644.
Translation of Official Query Dated Apr. 20, 2010 From the Japanese Patent Office Re.: Application No. 2003-584999.
Translation of the Office Action Dated Sep. 27, 2005 From the National Bureau of Standards, Ministry of Economic Affairs of Taiwan Re.: Application No. 92128407.
Translation of the Office Action Dated Oct. 31, 2008 From the State Intellectual Property Office of the People's Republic of China Re.: Application No. 200580023798.0.
Translation of the Official Letter Dated Dec. 17, 2004 From the National Bureau of Standards, Ministry of Economic Affairs of Taiwan Re.: 92128407.
Written Opinion Dated Aug. 2, 2006 From the International Searching Authority Re.: Application No. PCT/IL2005/000509.
Written Opinion Dated Apr. 12, 2007 From the International Searching Authority Re.: Application No. PCT/IL2006/000373.
Written Opinion Dated Dec. 16, 2008 From the International Searching Authority Re.: Application No. PCT/IB2008/050946.
Attisano et al. "Signal Transduction by the TGF-? Superfamily", Science, 296(5573): 1646-1647, 2002.
Cai et al. "A Study on Packaging of PZT MEMS Microphone", 2005 Electronics Components and Technology Conference, Lake Buena Vista, FL, USA, XP002488699, p. 1077-1080, Jun. 3, 2005. Retrieved From the Internet: URL:http://ieeexplore.ieee.org/ie15/9844/31024/01441405.pdf>.
Junge et al. "Simulation of Capacitive Micromachined Ultrasonic Transducers (cMUT) for Low Frequencies and Silicon Condenser Microphones Using an Analytical Model", Proceedings of the IEEE Ultrasonic Symposium, Honolulu, Hawaii, Oct. 5, 2005, XP010701172, 1: 485-488, Oct. 5, 2005. p. 487.
Neumann Jr. et al. "CMOS-MEMS Membrane for Audio-Frequency Acoustic Actuation", Sensors and Actuators A XP004377889, 95(2-3): 175-182, Jan. 1, 2002. p. 175, 182.
Nicolet et al. "Desulfovibrio Desulfuricans Iron Hydrogenase: The Structure Shows Unusual Coordination to An Active Site Fe Binuclear Center", Structure, 7: 13-23, 1999.
Nonaka et al. "Ultrasonic Position Measurement and Its Applications to Human Interface", Instrumentation and Measurement Technology Conference, IMTC/94, Conference Proceedings, 10th Anniversary, Advanced Technologies in I & M, IEEE Hamatsu, Japan, IEEE, New York, USA, XP010121966, p. 753-756, 1994.
Peters et al. "X-Ray Crystal Structure of the Fe-Only Hydrogenase (Cp1) From *Clostridium pasteurianum* to 1.8 Angstrom Resolution", Science, 282: 1853-1858, 1998.
Communication Under Rule 71(3) EPC Dated Jul. 29, 2011 From the European Patent Office Re.: Application No. 06728180.8.
Response Dated Dec. 2, 2011 to the Requisition by the Examiner of Jun. 3, 2011 From the Canadian Intellectual Property Office Re. Application No. 2,481,643.
Restriction Official Action Dated Feb. 16, 2012 From the US Patent and Trademark Office Re. U.S. Appl. No. 12/984,618.
Official Action Dated May 2, 2012 From the US Patent and Trademark Office Re. U.S. Appl. No. 12/984,617.
Examination Report Dated Jan. 6, 2012 From the Intellectual Property Office of New Zealand Re. Application No. 580288.
Official Action Dated Dec. 28, 2011 From the US Patent and Trademark Office Re.: U.S. Appl. No. 11/884,894.
Response Dated Dec. 20, 2011 to Examination Report of Feb. 28, 2011 From the Intellectual Property Office of New Zealand Re. Application No. 580288.
Response Dated Sep. 26, 2011 to Examination Report of Feb. 28, 2011 From the Intellectual Property Office of New Zealand Re. Application No. 580288.
Translation of Decision on Rejection Dated Nov. 24, 2011 From the State Intellectual Property Office of the People's Republic of China Re.: Application No. 200680017983.3.
Official Action Dated Oct. 16, 2012 From the US Patent and Trademark Office Re. U.S. Appl. No. 12/984,617.
Supplemental Notice of Allowability Dated Jun. 6, 2012 From the US Patent and Trademark Office Re.: U.S. Appl. No. 11/884,894.
Supplemental Notice of Allowability Dated Jun. 15, 2012 From the US Patent and Trademark Office Re.: U.S. Appl. No. 11/884,894.
Translation of Office Action Dated Jul. 4, 2012 From the State Intellectual Property Office of the People's Republic of China Re. Application No. 200880016222.5.
Official Action Dated Aug. 24, 2012 From the US Patent and Trademark Office U.S. Appl. No. 12/531,075.
Translation of Notice of the Reason for Rejection Dated Aug. 21, 2012 From the Korean Intellectual Property Office Re. Application No. 2007-7024247.
Official Action Dated Aug. 2, 2012 From the US Patent and Trademark Office Re.: U.S. Appl. No. 10/510,228.

* cited by examiner

BOTTOM VIEW
(5a-1)
AA
530
510
AA VIEW
(5a-2)
530
510

6200
6210
6210
6220
6220
A
A 850
805
800
820
830
810

10100
10000
10200

1410
1420
1450
1470

Estimator (Decoding Unit)
Estimated Coordinates
Path Estimator
Maximum Likelihood Detector
Correlator
Acoustic Samples Bank
Transmitter Timing Estimator
IR Timing Samples Bank
Signal Model
70
71
72
73
74
75
76
77
78

Signal Generator
Output AnalogFilter
Transducer Model
Channel
+
NoiseModel
Microphone Model
Input Analog Filter
Estimator
14
20
24
25
26
27
28
29
30
31

METHOD AND SYSTEM FOR DIGITAL PEN ASSEMBLY

RELATED APPLICATIONS

This application is a continuation of U.S. patent application Ser. No. 11/884,894 filed on Aug. 22, 2007, which is a National Phase of PCT Patent Application No. PCT/IL2006/000373 having International Filing Date of Mar. 23, 2006, which claims the benefit of priority of U.S. Provisional Patent Application No. 60/664,202 filed on Mar. 23, 2005.

The contents of the above Applications are all incorporated herein by reference.

FIELD AND BACKGROUND OF THE INVENTION

The present invention relates to acoustic positioning methods, and more particularly, but not exclusively to a method and an apparatus for data entry using an acoustic signal transmitting pen input device.

Digital writing instruments, interchangeably referred to herein as Digital Pens, regardless of whether they actually write on paper, can be used to capture pen strokes on paper and digitize them.

For example, with a digital pen, pen strokes may be converted by handwriting recognition software to a digitally stored record of the writing. In this way, a laborious, tedious step in modern written communication, namely, the manual transcribing of handwriting into a computerized word processor, is eliminated, greatly increasing productivity.

Sensing a time-dependent position of the pen and converting the positions to pen strokes may be used for input of digital representations of the pen strokes to a handwriting recognition device.

As known in the art, ultrasonic systems can be used in which a special pen generates or alters an ultrasonic signal, as the pen is moved across a piece of paper.

The ultrasonic signal is sensed by receivers and correlated to a position vis-à-vis each receiver, as the outputs of the receivers is triangulated and correlated to absolute pen positions. A sequence of pen positions can then be digitized for input into handwriting recognition engines.

An advantage with ultrasonic systems is that the user of the ultrasonic signal emitting device can use the device to write on an ordinary piece of paper that is placed on or nearby a base station, which receives the ultrasonic signals and converts the signals to alpha-numeric characters.

There are many currently known in the art methods for data entry using an acoustic impulse transmitting pen input device.

U.S. Pat. No. 4,814,552, to Stefik, filed on Dec. 2, 1987, entitled "Ultrasonic position input device", describes an input device, or stylus, for entering hand drawn forms into a computer comprising a writing instrument, a pressure switch for determining whether the instrument is in contact with the writing surface, an acoustic transmitter for triangulating the position of the stylus on the surface, and a wireless transmitter for transmitting data and timing information to the computer.

In operation, the stylus described by Stefik transmits an infrared signal which the system receives immediately, and an ultrasound pulse which two microphones receive after a delay which is a function of the speed of sound and the distance of the stylus from each microphone.

U.S. Pat. No. 6,654,008, to Ikeda, filed on Nov. 27, 2001, entitled "Electronic whiteboard and penholder used for the same", describes an electronic whiteboard capable of being drawn, using marker pens of several colors, and one penholder for use in such an electronic whiteboard.

In Ikeda's patent, an infrared light emitting unit emits infrared light containing color information of the marker pen, an ultrasonic wave emitting unit emits the ultrasonic wave, and color information changeover means changes over color information depending on the color of marker pen. The electronic whiteboard main body receives the infrared light and ultrasonic wave emitted from the penholder, and issues information about a position of the penholder depending on the reception timing of the infrared light and ultrasonic wave.

U.S. Pat. No. 6,876,356 to Zloter, filed on Mar. 18, 2002, entitled "Digitizer pen", describes a digitizer pen system including a pen having a means protruding from the pen's writing tip, for preventing fingers blocking communication with a base unit.

U.S. Pat. No. 6,184,873 to Ward, filed on Jan. 20, 1998, entitled "Pen positioning system", describes a pen positioning system including a pen. The pen has multiple output elements and is adapted to accurately determine the location of the pointing tip of the pen, in relation to an electronic tablet.

The output elements, preferably ultrasonic transmitters having distinct frequencies, are located a fixed distance from each other, and are also related in space to the pointing tip of the pen.

A detection system is used to receive the output signals from the output elements, isolate the output signals from each other, and process them independently, to determine the location of the output elements and of the pointing tip of the pen.

U.S. Pat. No. 6,703,570 to Russel, filed on May 10, 2000, entitled "Digital pen using ultrasonic tracking", describes a digital pen system. Russel's system includes an elongated pen defining a writing tip, and an ultrasonic transducer oriented on the pen to direct frames of ultrasonic energy outwardly from the pen, with each frame including plural receive pulses.

The digital pen system in Russel's patent further includes two or more detectors positioned on a base, such as a laptop computer, for receiving the pulses, with each pulse being associated with at least one pulse time of arrival (TOA) relative to at least one detector. Russel's system further includes a processor positioned on the base, receiving signals from the detectors, and outputting position signals representative of positions of the pen, based on the received signals.

However, there are inherent problems in current acoustical technology and in the implementation of the current acoustical technology in digital pens, such as the digital pens described in the patents cited hereinabove.

Among the disadvantages of current acoustic technology are: lack of accuracy, lack of multi-devices support, high power consumption, etc. The problems have implications on the mechanical design of existing data entry using an acoustic impulse transmitting devices.

Apart from that, there are manufacturing problems related to the assembly of the acoustic transmitter and its incorporation in a digital pen or the like. For instance, such problems may arise in connecting an acoustic transmitter to a flexible printed circuit board (PCB). There are also marketing issues, such as differentiation between products by changing their appearance, while keeping the functional parts the same.

There is thus a widely recognized need for, and it would be highly advantageous to have, an apparatus or a method devoid of the above limitations.

SUMMARY OF THE INVENTION

According to one aspect of the present invention there is provided a digital pen comprising:

an electric circuit;

an acoustic transmitter, detached from said electric circuit, and configured to transmit acoustic signals; and a resilient holder, configured to mechanically press said electric circuit into electrical contact with said transmitter, so as to electrically connect said electric circuit and said transmitter.

According to a second aspect of the present invention there is provided a resilient holder comprising a base and extensions arising perpendicularly therefore and configured for location of a first electrical circuit and a second electrical circuit thereon within the confines of a housing, and such as to bring about an electrical contact between said first and second electrical circuits due to said confinement within said housing.

According to a third aspect of the present invention there is provided a digital pen comprising:

an acoustic transmitter, configured to transmit acoustic signals; and a switch assembly having two switching points for pressing said assembly to achieve first and second switching modes respectively, the assembly further having a third mode selectable upon said two switching points being pressed substantially simultaneously.

A digital pen comprising:

a pen tip, an acoustic transmitter, configured to transmit acoustic signals, and located in proximity to said pen tip; and a smooth contact switch, configured to smoothly actuate the digital pen upon transmission thereto of a writing pressure from said pen tip.

According to a fourth aspect of the present invention there is provided a digital pen comprising:

an elongated body terminating in a writing tip;

a writing element protruding from said writing tip;

an acoustic transmitter, deployed adjacent to said writing tip, configured to transmit an acoustic signal, and a rotating cover, adjacently mounted to said writing tip, covering said writing element upon being rotated in one direction, and exposing said writing element upon being rotated in a direction opposite to said one direction.

According to a fifth aspect of the present invention there is provided a digital pen comprising:

an elongated body terminating in a writing tip;

a writing element protruding from said writing tip, an acoustic transmitter deployed adjacent to said writing tip, configured to transmit an acoustic signal, and an elongated housing covering said elongated body, said elongated body being movable inside said elongated housing for exposing and for covering said writing element.

According to a fifth aspect of the present invention there is provided a digital pen, comprising:

an acoustic signal transmitter, configured to transmit acoustic signals; and an acoustic wave guide, positioned adjacent to said acoustic transmitter, said acoustic wave guide comprising a plurality of fins radiating outwardly in a direction away from said acoustic signal transmitter.

According to a sixth aspect of the present invention there is provided a receiving unit for receiving an acoustic signal from a digital pen, comprising:

at least two ultrasound receivers, for receiving ultrasound signals from the digital pen; and an electric circuit connected to said ultrasound receivers, and configured to extract ultrasound signals received by said ultrasound receivers, said extraction comprises referencing a reference model comprising data pertaining to expected reference signals.

According to a seventh aspect of the present invention there is provided a digital pen system, comprising:

a digital pen having an elongated body terminating in a writing tip, a writing element protruding from said writing tip, and an acoustic signal transmitter deployed adjacent to said writing tip and configured to transmit an acoustic signal;

at least one receiving unit for receiving said acoustic signal from said digital pen; and a processor, associated with said at least one receiving unit, configured to process said received acoustic signal, for determining presence of said digital pen in a predefined area, and to trigger a predefined functionality upon said determining presence; and a map, configured to graphically map said predefined area, so as to assist a user in positioning the digital pen in said predefined area.

According to an eighth aspect of the present invention there is provided a digital pen system comprising:

a digital pen having an electric circuit, an acoustic transmitter configured to transmit acoustic signals, detached from said electric circuit, and a resilient holder, configured to press said electric circuit into contact with said transmitter upon applying a mechanical pressure to said resilient holder, so as to electrically connect said electric circuit and said transmitter;

at least one receiving unit for receiving said acoustic signals from said digital pen; and a processor, associated with said at least one receiving unit, configured to process said received acoustic signals for determining location of said digital pen.

According to a ninth aspect of the present invention there is provided a digital pen system comprising:

a digital pen having an acoustic transmitter, configured to transmit acoustic signals and a switch assembly having two switching points for pressing said assembly to achieve first and second switching modes respectively, said assembly further having a third mode selectable upon said two switching points being pressed substantially simultaneously at least one receiving unit, configured to receive said acoustic signals from said digital pen; and a processor, associated with said at least one receiving unit, configured to process said received acoustic signals for determining location of said digital pen.

According to a tenth aspect of the present invention there is provided a digital pen system comprising:

a digital pen having an acoustic transmitter, configured to transmit acoustic signals, and a smooth contact switch configured to actuate the digital pen upon applying a pressure on said smooth contact switch;

at least one receiving unit, configured to receive said acoustic signals from said digital pen; and a processor, associated with said at least one receiving unit, configured to process said received acoustic signals, for determining location of said digital pen, said smooth contact switch comprises a resilient element, mounted on a first side of an open electric circuit and disconnected from a second side of said electric circuit, said resilient element being compressible into a position where said resilient element contacts said second side of said electric circuit, thereby closing said electric circuit, upon applying a writing pressure compressing said resilient element into said position.

According to an eleventh aspect of the present invention there is provided a digital pen system comprising:

a digital pen having an acoustic transmitter, configured to transmit acoustic signals;

at least one receiving unit, said receiving unit having at least two ultrasound receivers, configured to receive an ultrasound signal from said digital pen; and a processor, associated with said at least one receiving unit, configured to process said ultrasound signals, for extracting location of said digital pen, said extraction comprises referencing a reference model comprising data pertaining to expected reference signals.

According to a twelfth aspect of the present invention there is provided a digital pen system comprising:

a digital pen having an acoustic transmitter, configured to transmit acoustic signals;

at least one receiving unit, said receiving unit having a housing, and at least two acoustic signal receivers positioned inside said housing, less than 65 mm apart from each other, and configured to receive an acoustic signal from said digital pen; and a processor, associated with said at least one receiving unit, configured to process said acoustic signal, for determining location of said digital pen.

According to a thirteenth aspect of the present invention there is provided a smooth contact switch, comprising:

a resilient element, mounted on a first side of an open electric circuit and disconnected from a second side of said electric circuit, said resilient element being compressible into a position where said resilient element contacts said second side of said electric circuit, thereby closing said electric circuit, upon applying pressure compressing said resilient element into said position.

According to a fourteenth aspect of the present invention there is provided a digital sleeve, mountable on a writing instrument, the digital sleeve comprising:

an acoustic signal transmitter, configured to transmit an acoustic signal;

a writing sensor, connected to said acoustic transmitter, configured to detect a predefined movement of the writing instrument in relation to the digital sleeve and to actuate said acoustic signal transmitter upon said detection.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

Figure 1:
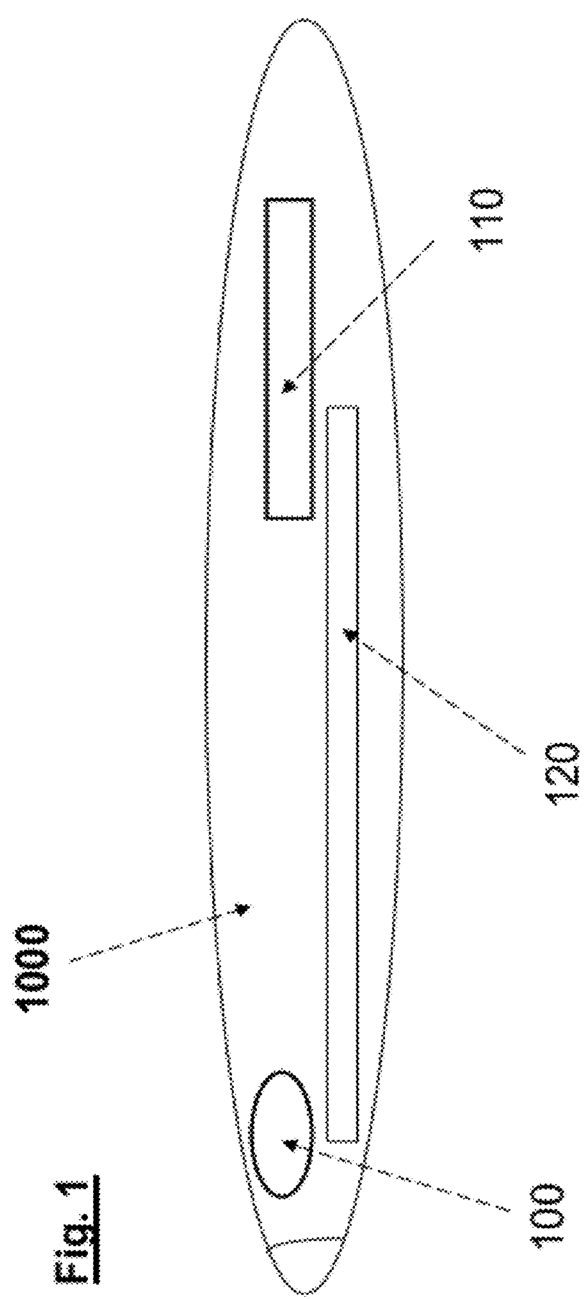

FIG. 1 a simplified block diagram illustrating a digital pen, according to a preferred embodiment of the present invention.

Figure 2A:
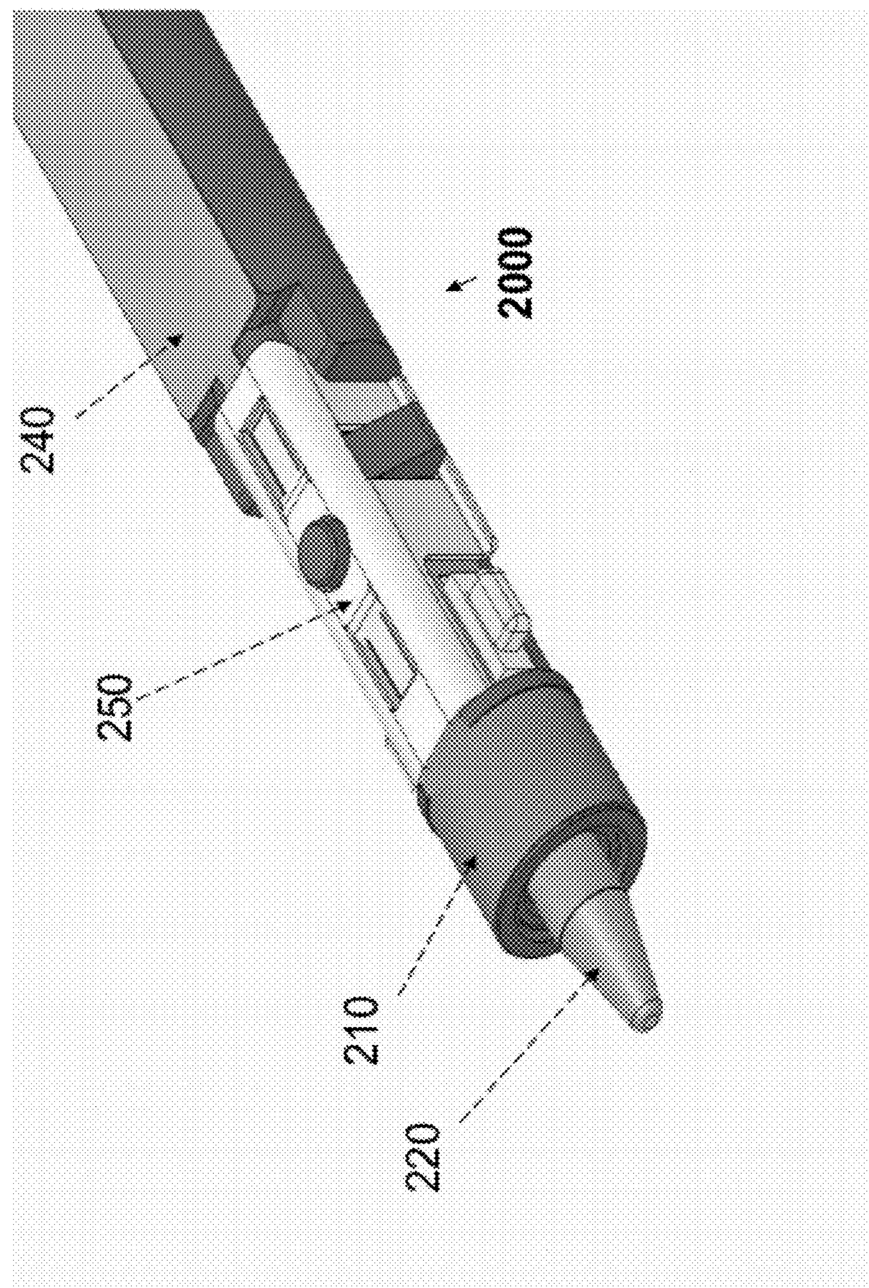
Figure 2B:
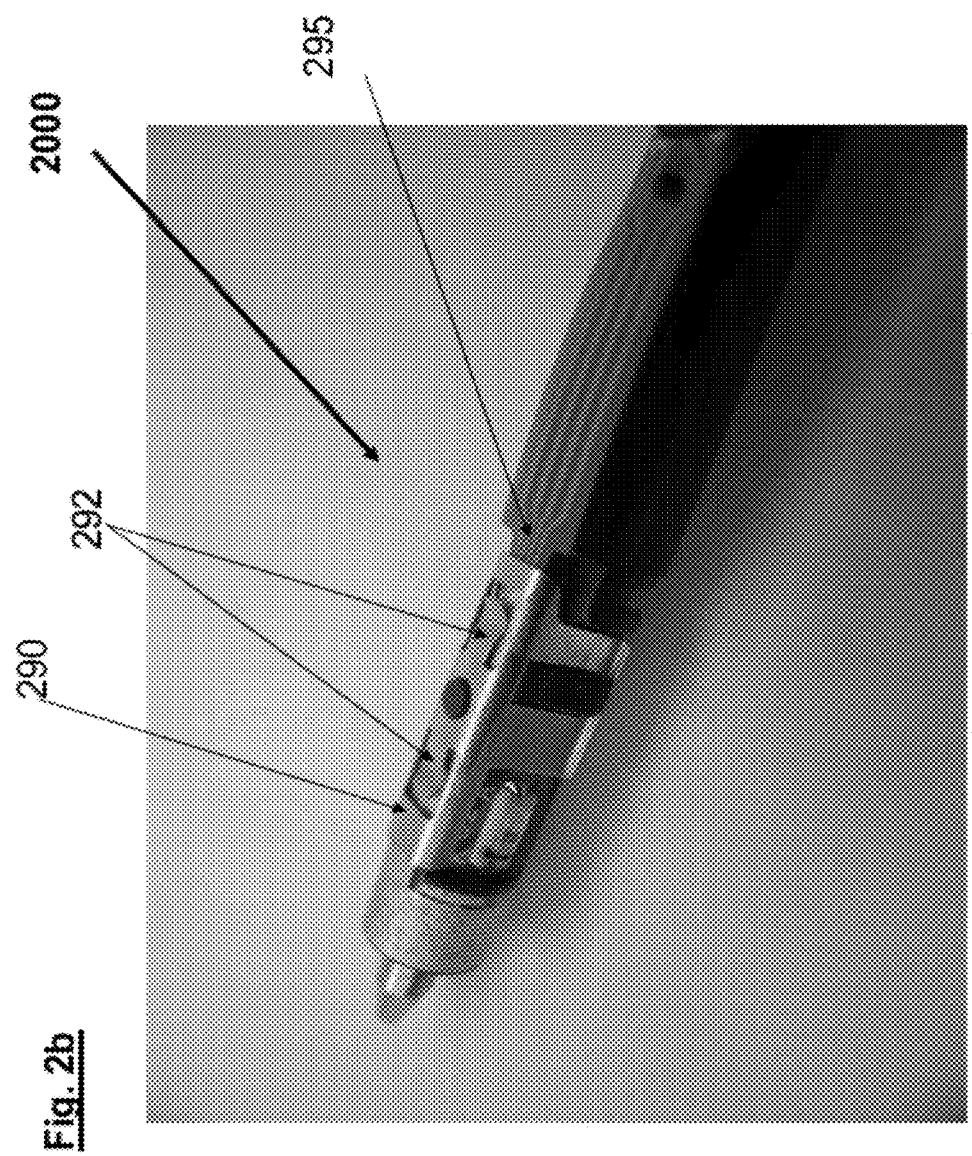

FIGS. 2*a* and 2*b* are exemplary depictions of a resilient holder, deployed inside a digital pen, according to a preferred embodiment of the present invention.

Figure 3:
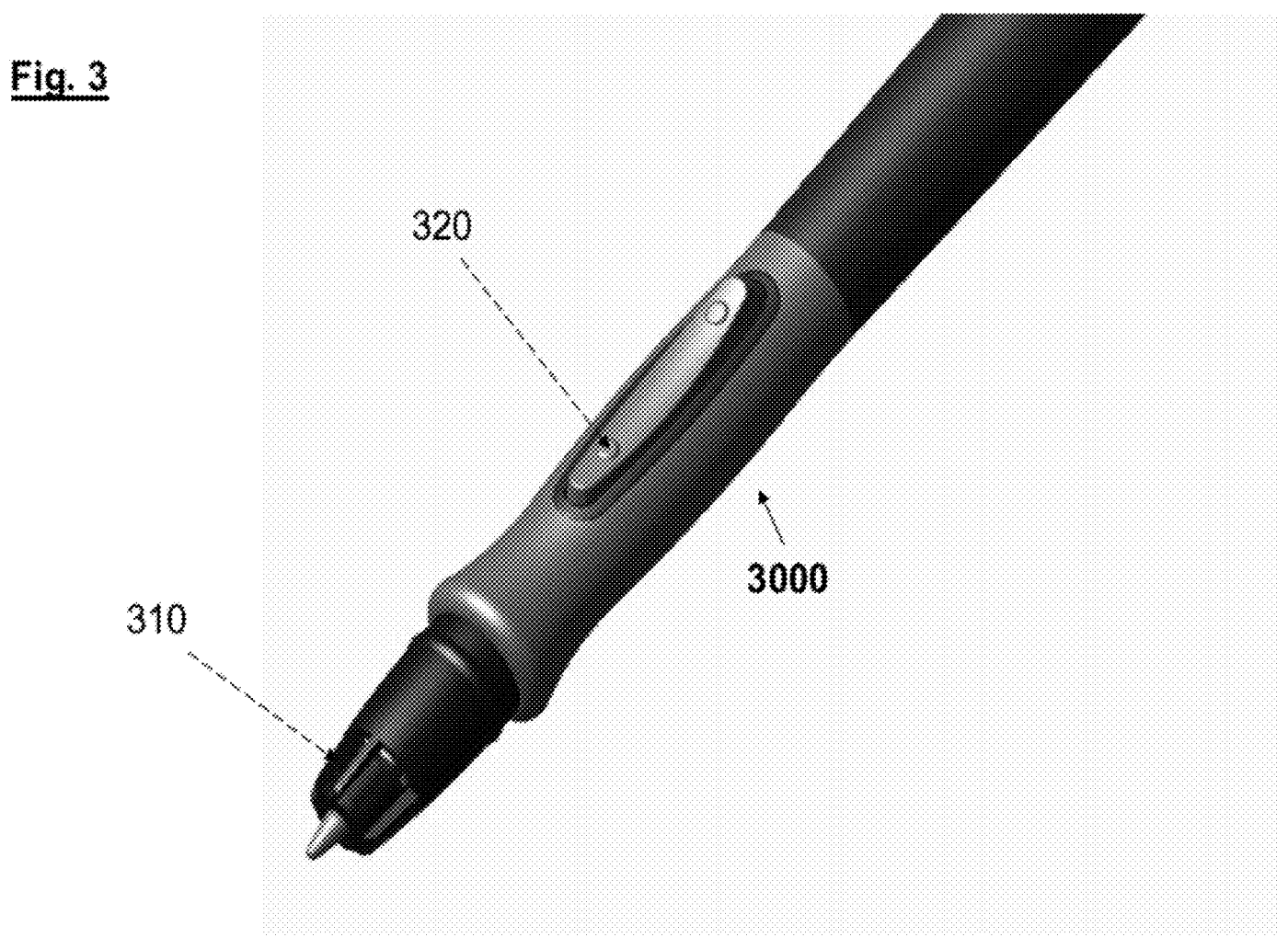

FIG. 3 is an exemplary depiction of a digital pen having a switch assembly comprising two switches, according to a preferred embodiment of the present invention.

Figure 4A:
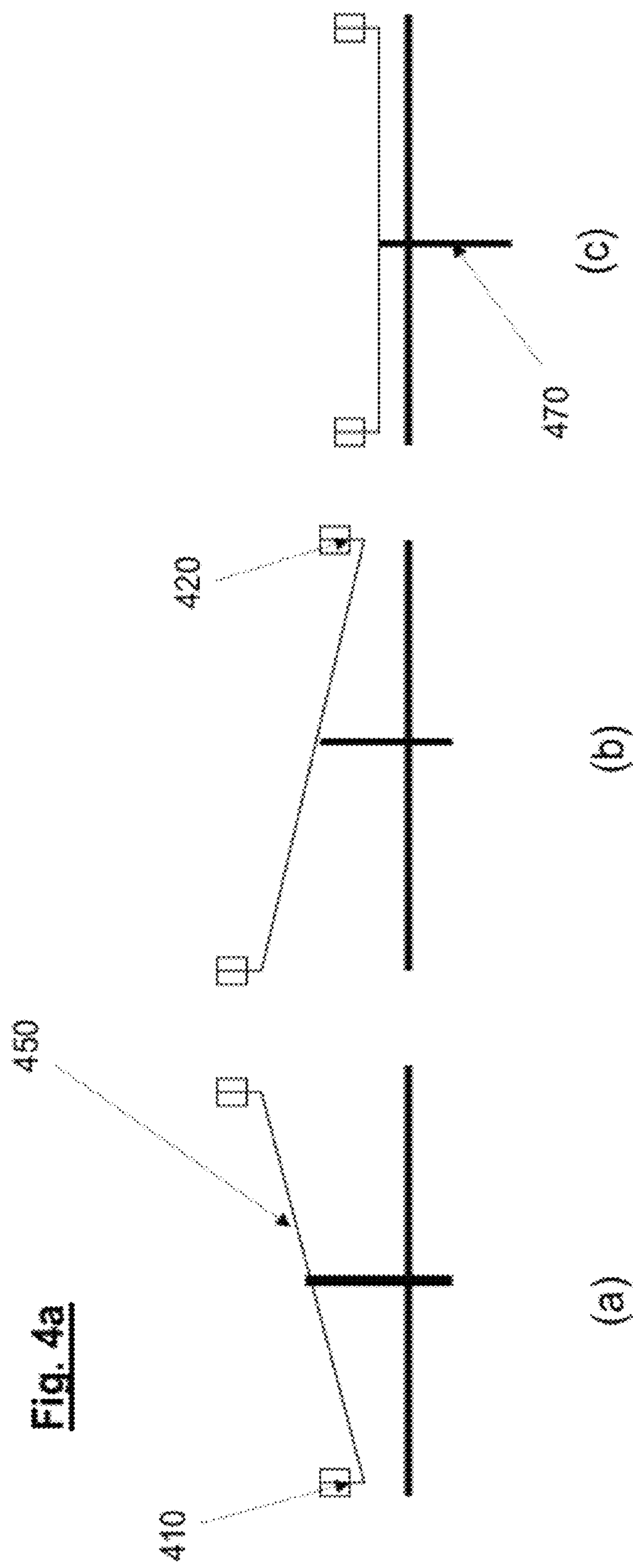

FIG. 4*a* is a simplified block diagram schematically illustrating an exemplary switch assembly mechanical design, according to a preferred embodiment of the present invention.

Figure 4B:
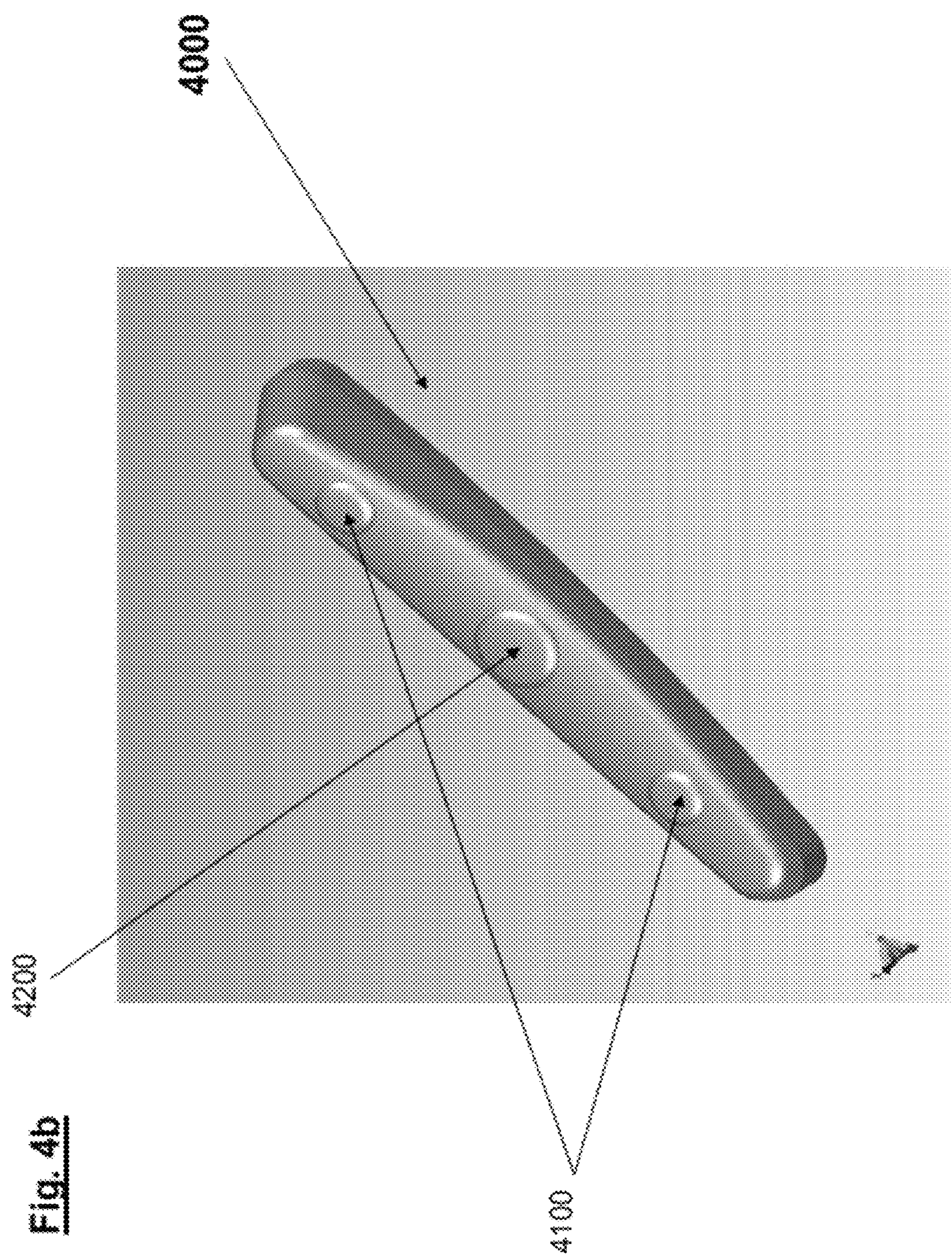

FIG. 4*b* is a diagram showing a first exemplary cover element for a switch assembly, according to a preferred embodiment of the present invention.

Figure 4C:
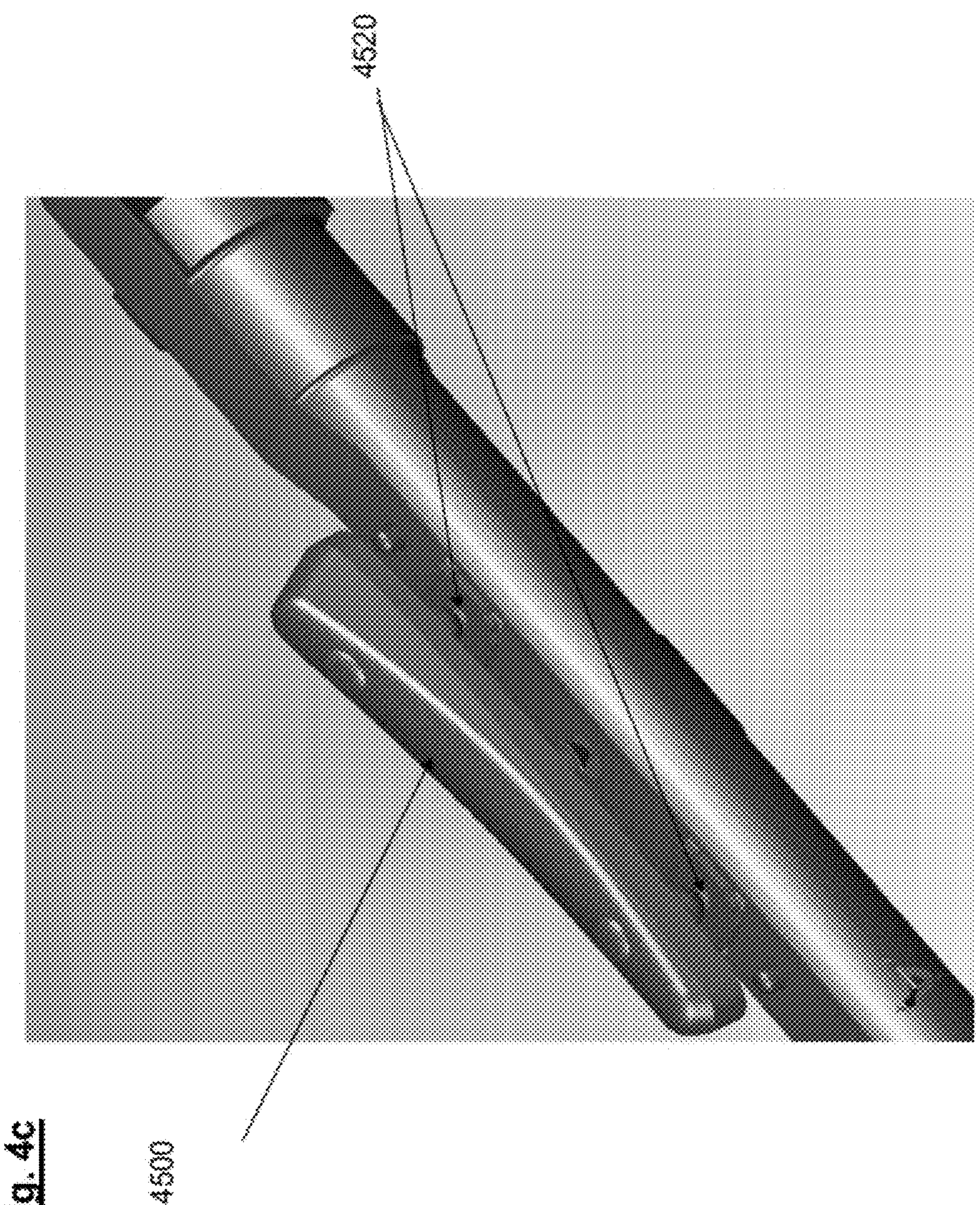

FIG. 4*c* is a diagram showing a second exemplary cover element for a switch assembly, according to a preferred embodiment of the present invention.

Figure 5A:
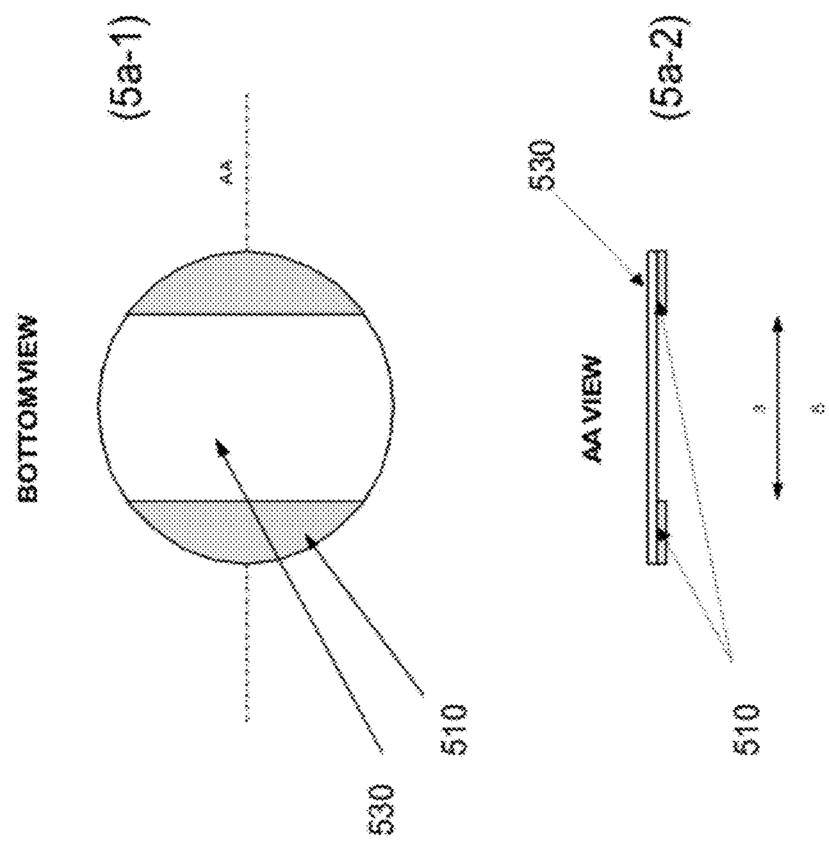

FIGS. 5*a*-1 and 5*a*-2 are simplified block diagrams depicting a touch switch, according to a preferred embodiment of the present invention.

Figure 5B:
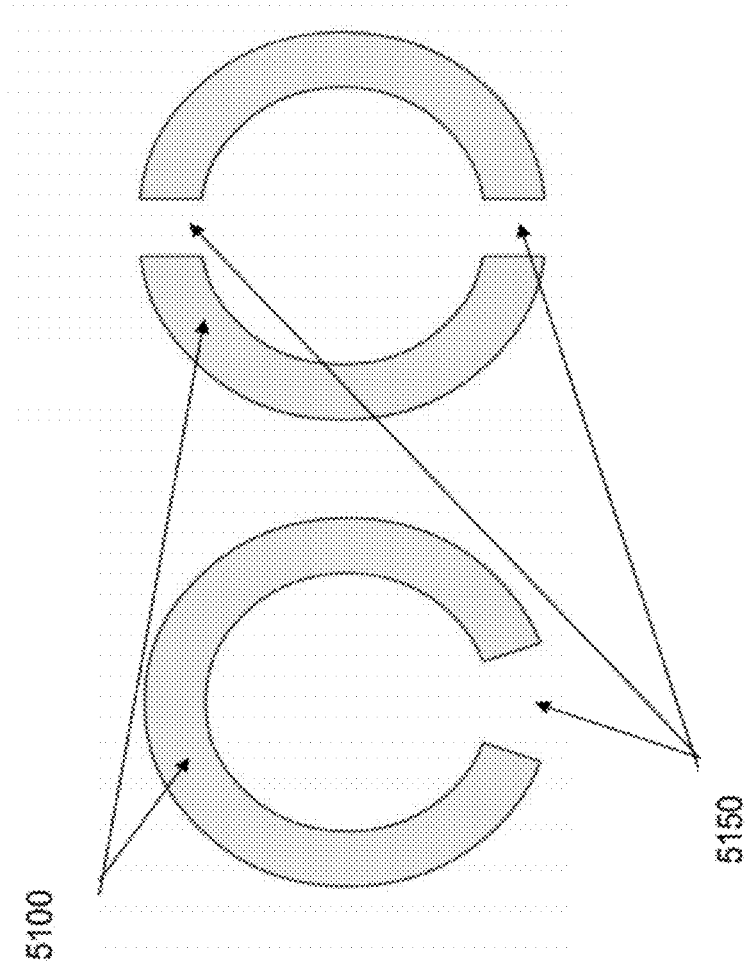

FIG. 5*b* is a simplified diagram, illustrating an adhesive having a vent, according to a preferred embodiment of the present invention.

Figure 6A:
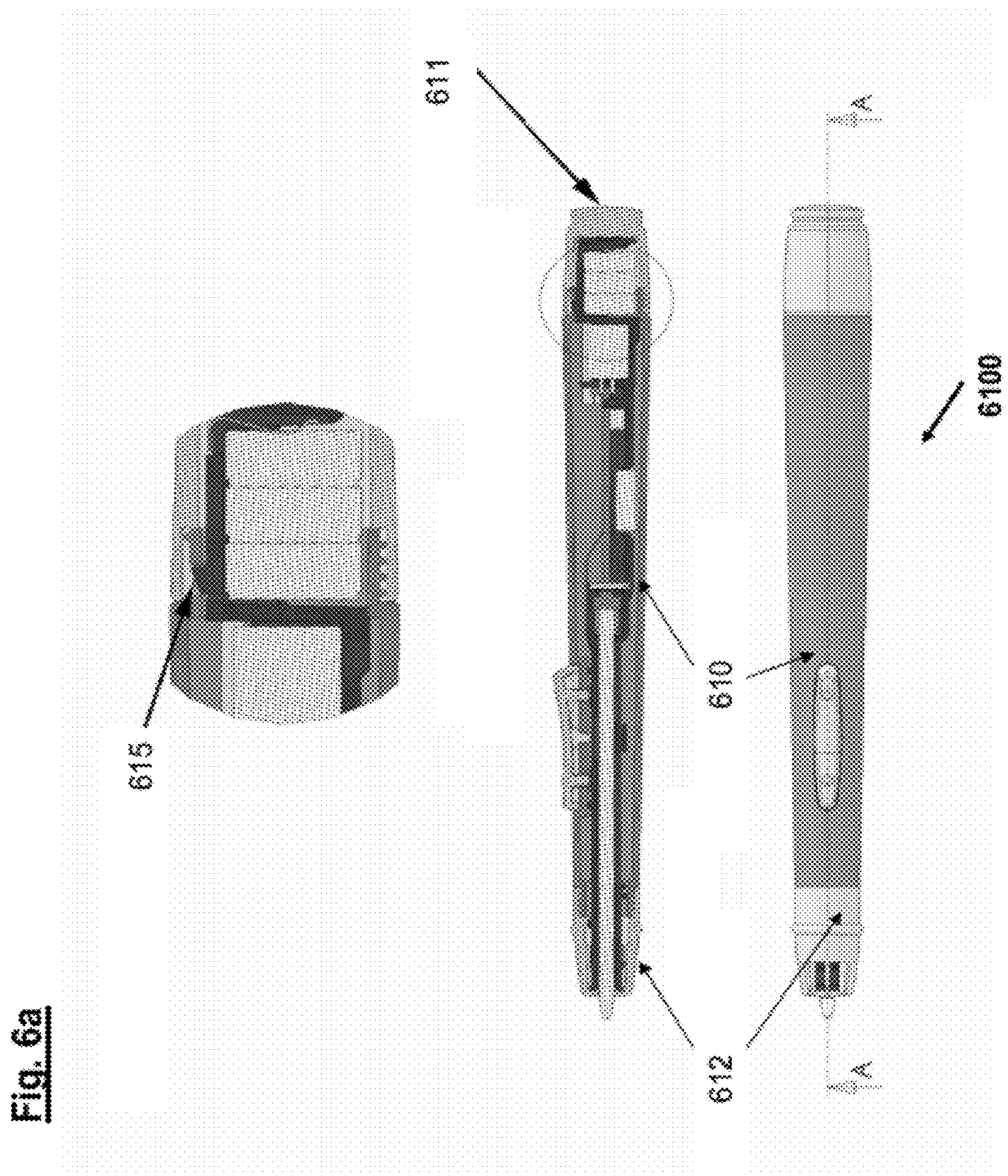

FIG. 6*a* is a simplified diagram illustrating a first digital pen having a changeable cover element, according to a preferred embodiment of the present invention.

Figure 6B:
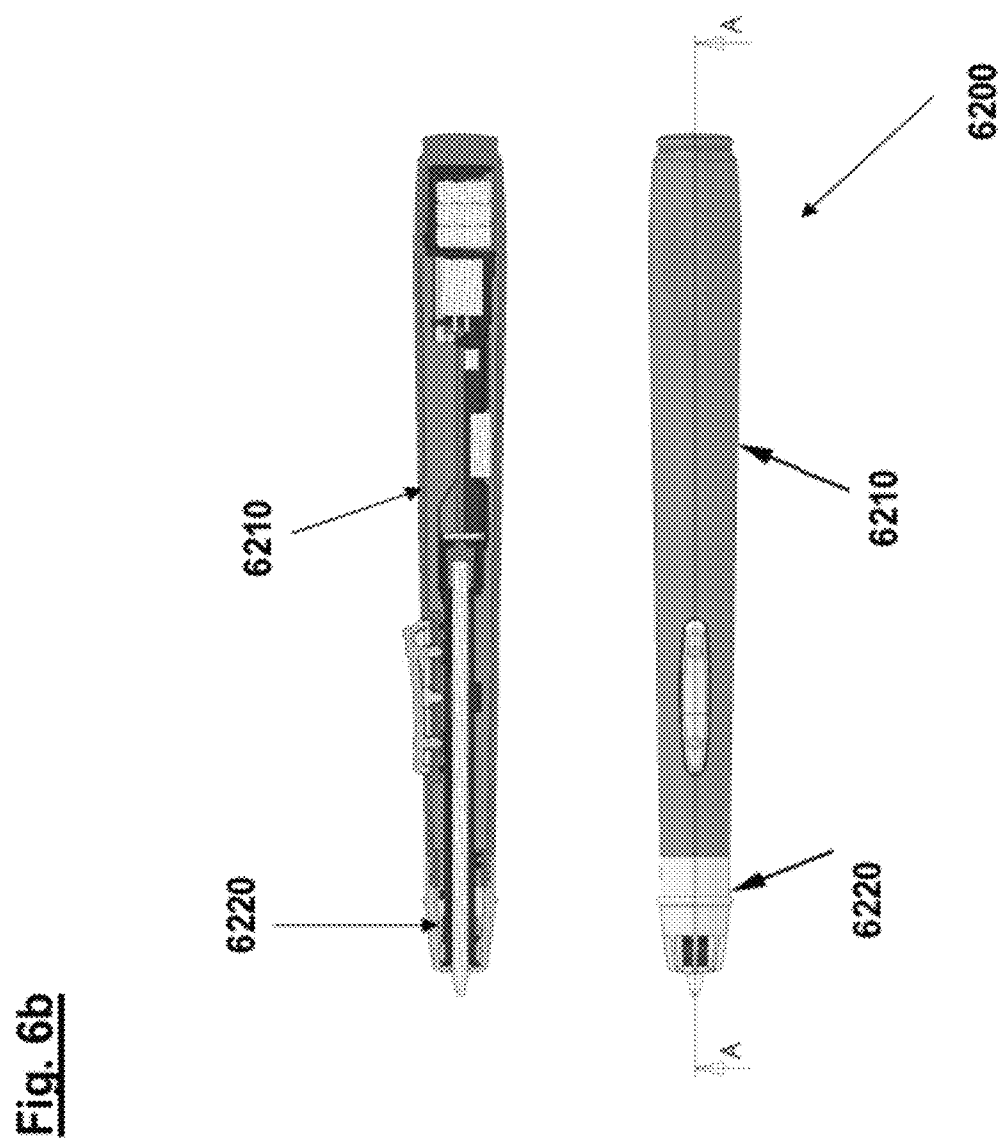

FIG. 6*b* is a simplified diagram illustrating a second digital pen having a changeable cover element, according to a preferred embodiment of the present invention.

Figure 6C:
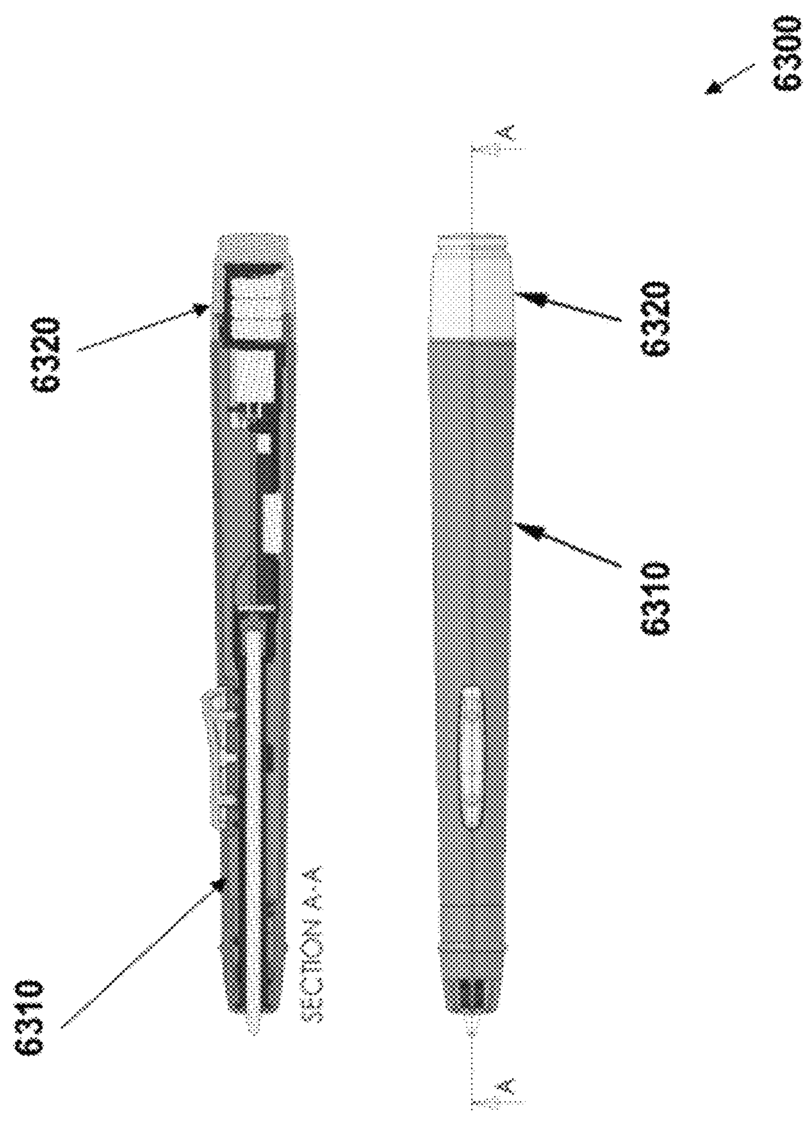

FIG. 6*c* is a simplified diagram illustrating a third digital pen having a changeable cover element, according to a preferred embodiment of the present invention.

Figure 6D:
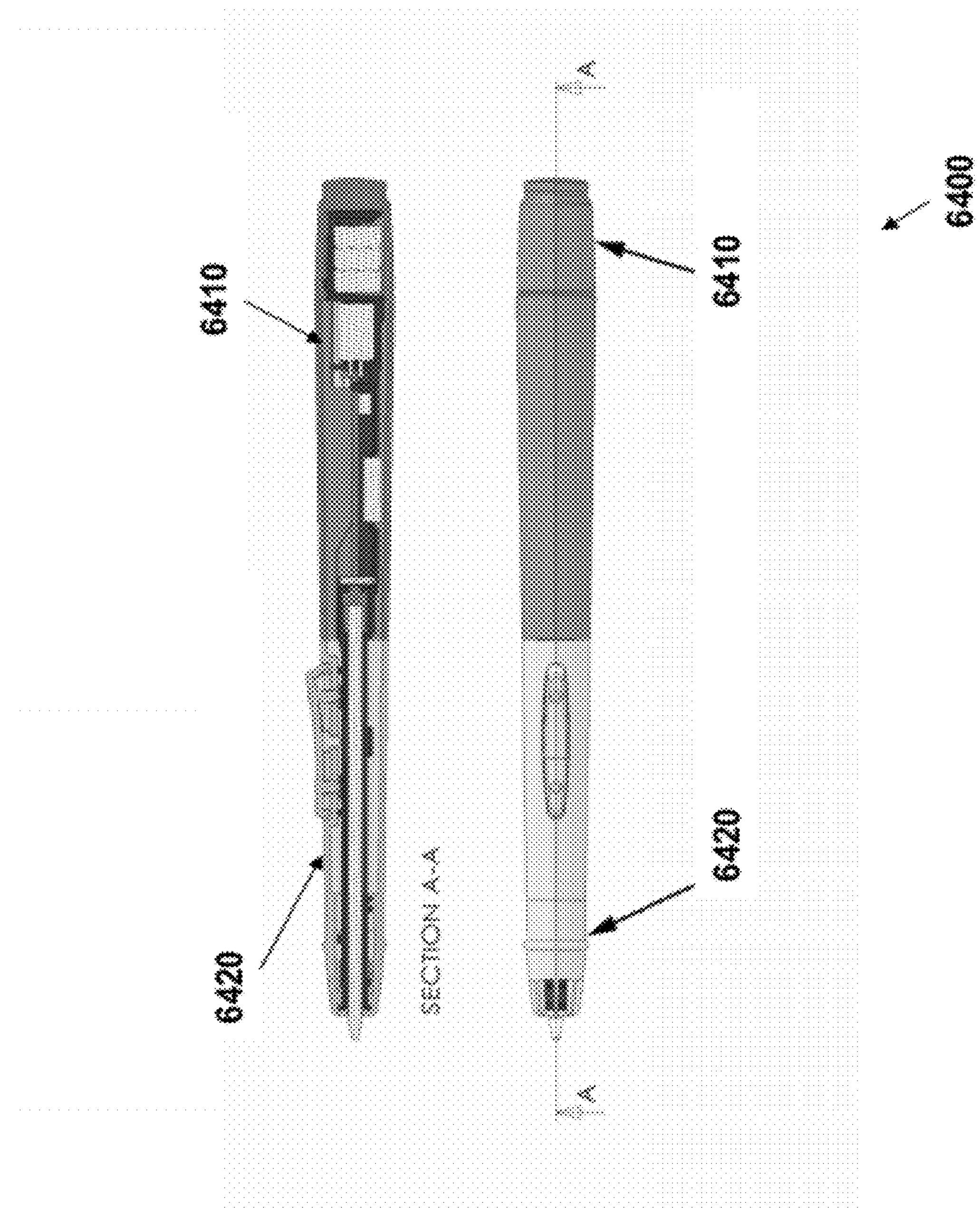

FIG. 6*d* is a simplified diagram illustrating a fourth digital pen having a changeable cover element, according to a preferred embodiment of the present invention.

Figure 7A:
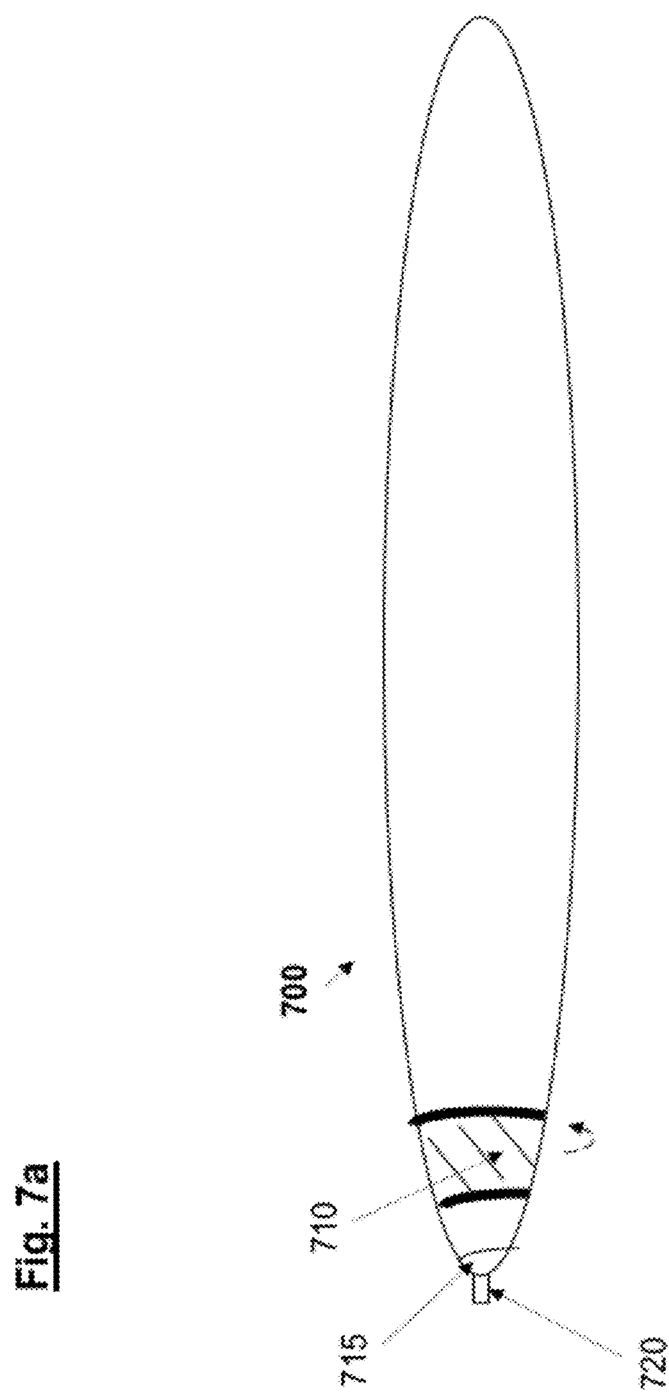

FIG. 7*a* is a simplified block diagram illustrating a first retractable digital pen according to a preferred embodiment of the present invention.

Figure 7B:
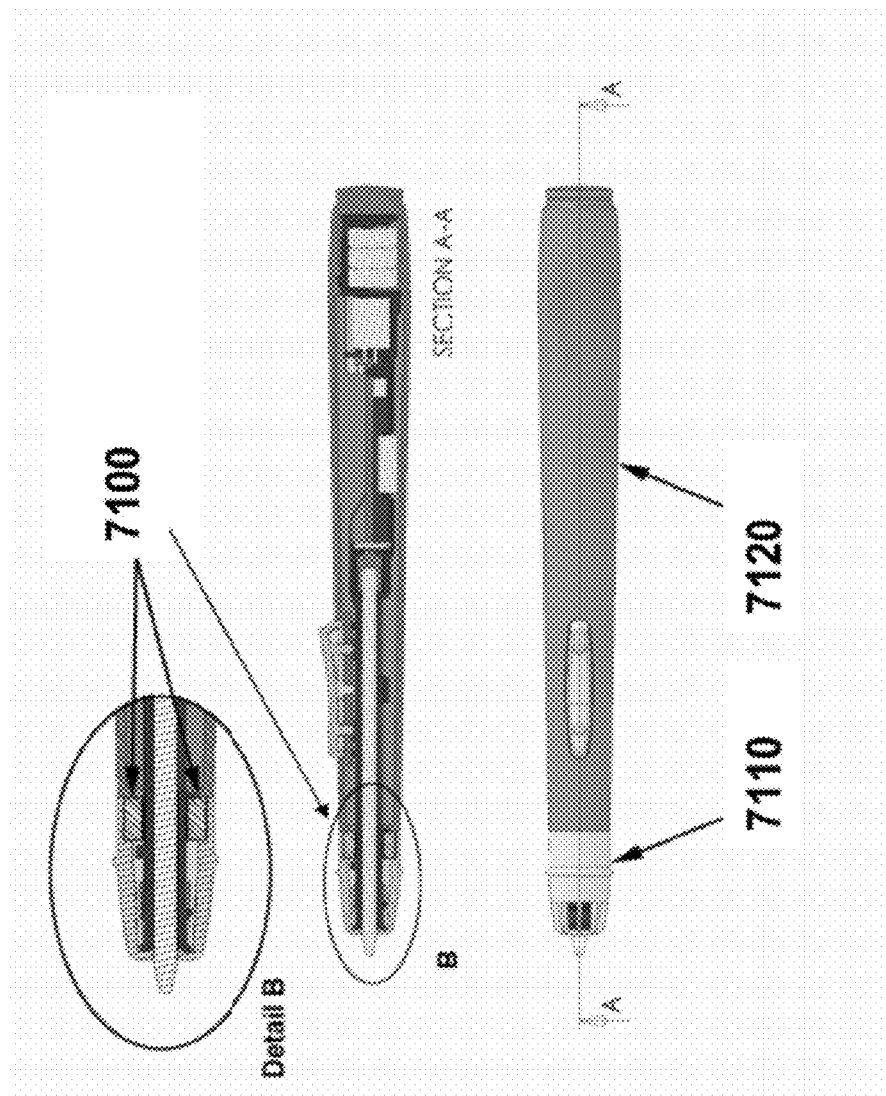

FIG. 7*b* is a simplified diagram illustrating a second retractable digital pen according to a preferred embodiment of the present invention.

Figure 8A:
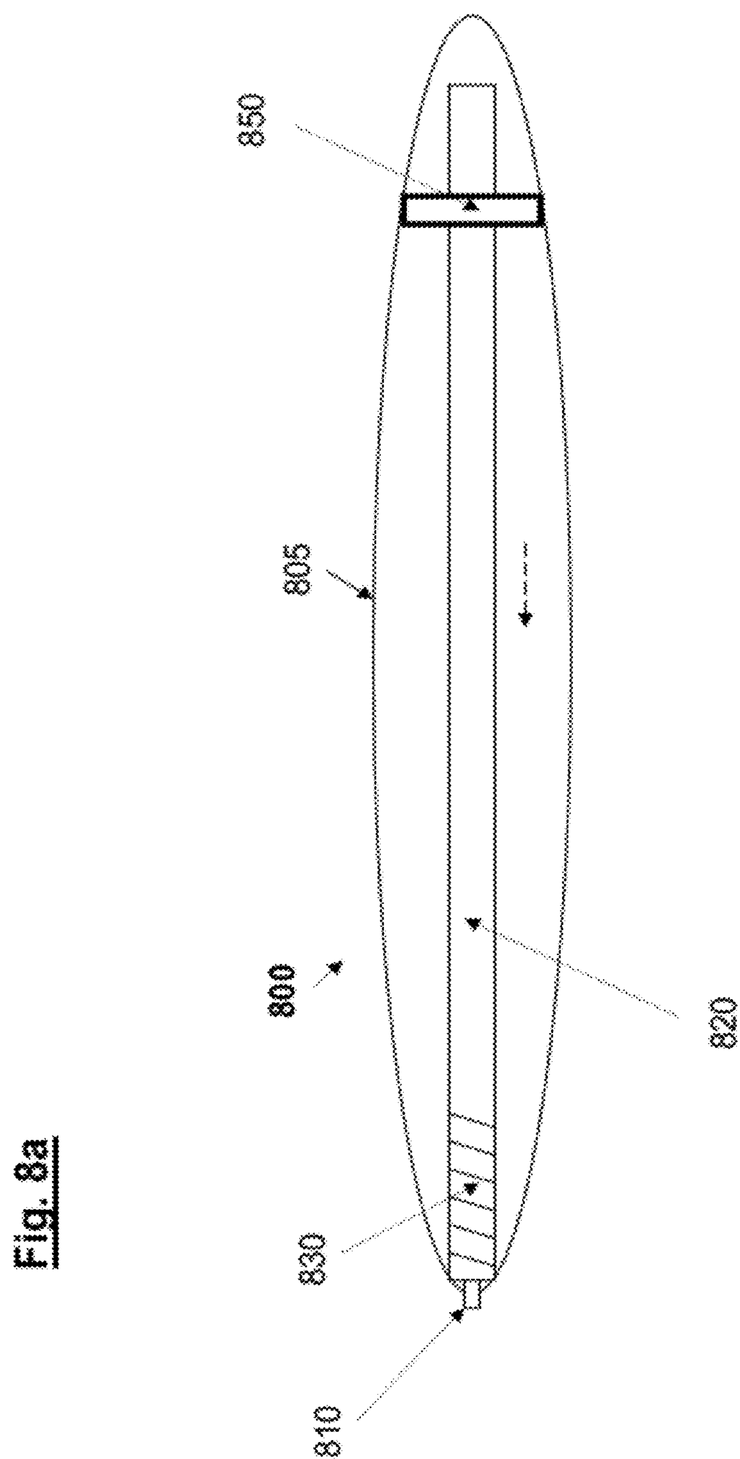

FIG. 8*a* is a simplified block diagram illustrating a second retractable digital pen, according to a preferred embodiment of the present invention.

Figure 8B:
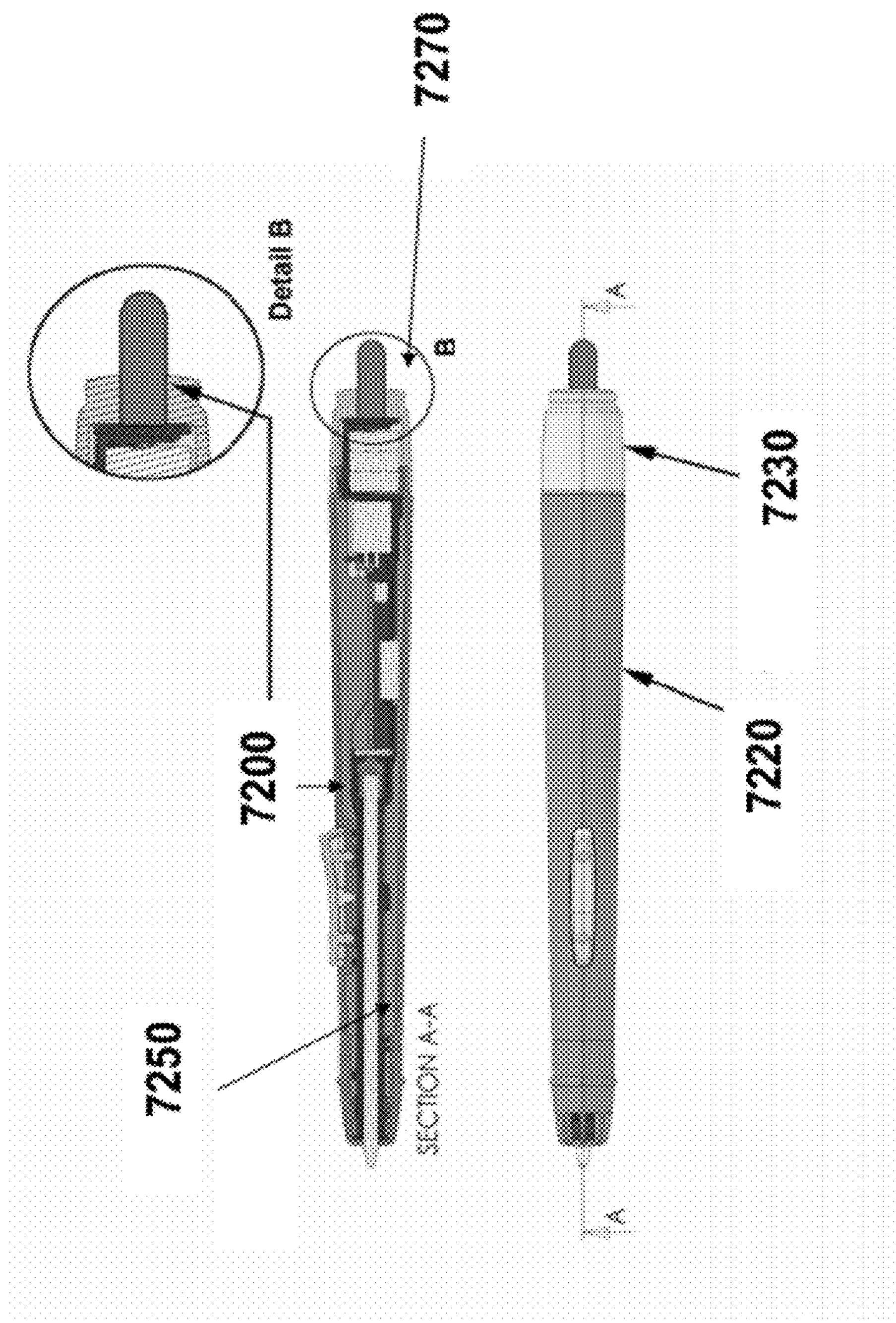

FIG. 8*b* is a simplified diagram illustrating a second retractable digital pen, according to a preferred embodiment of the present invention.

Figure 9:
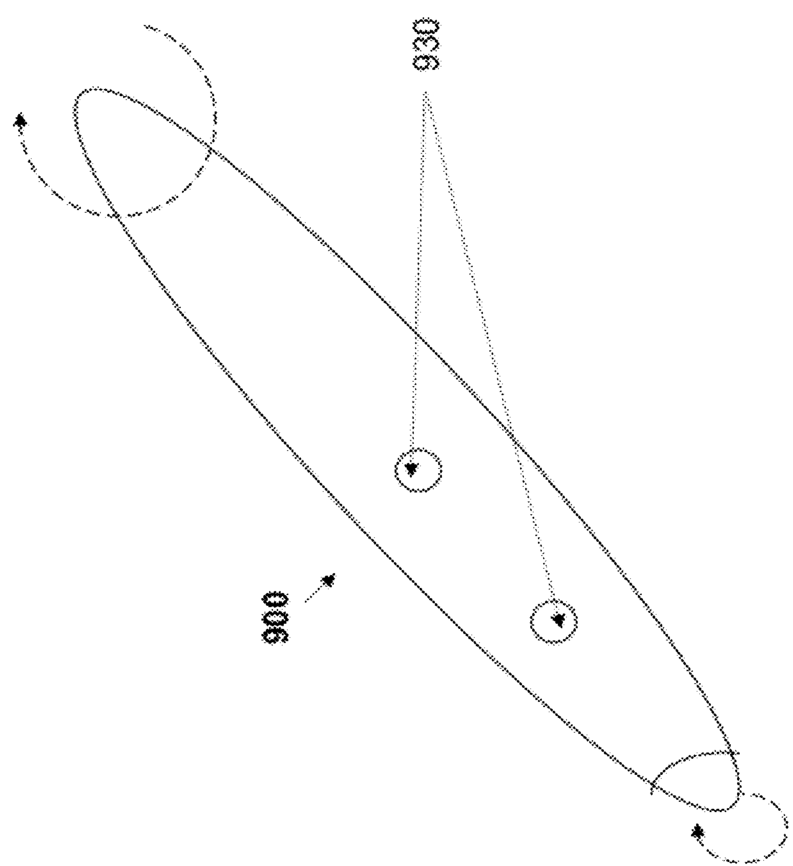

FIG. 9 is a simplified block diagram schematically illustrating a digital pen having two acoustic transmitters according to a preferred embodiment of the present invention.

Figure 10:
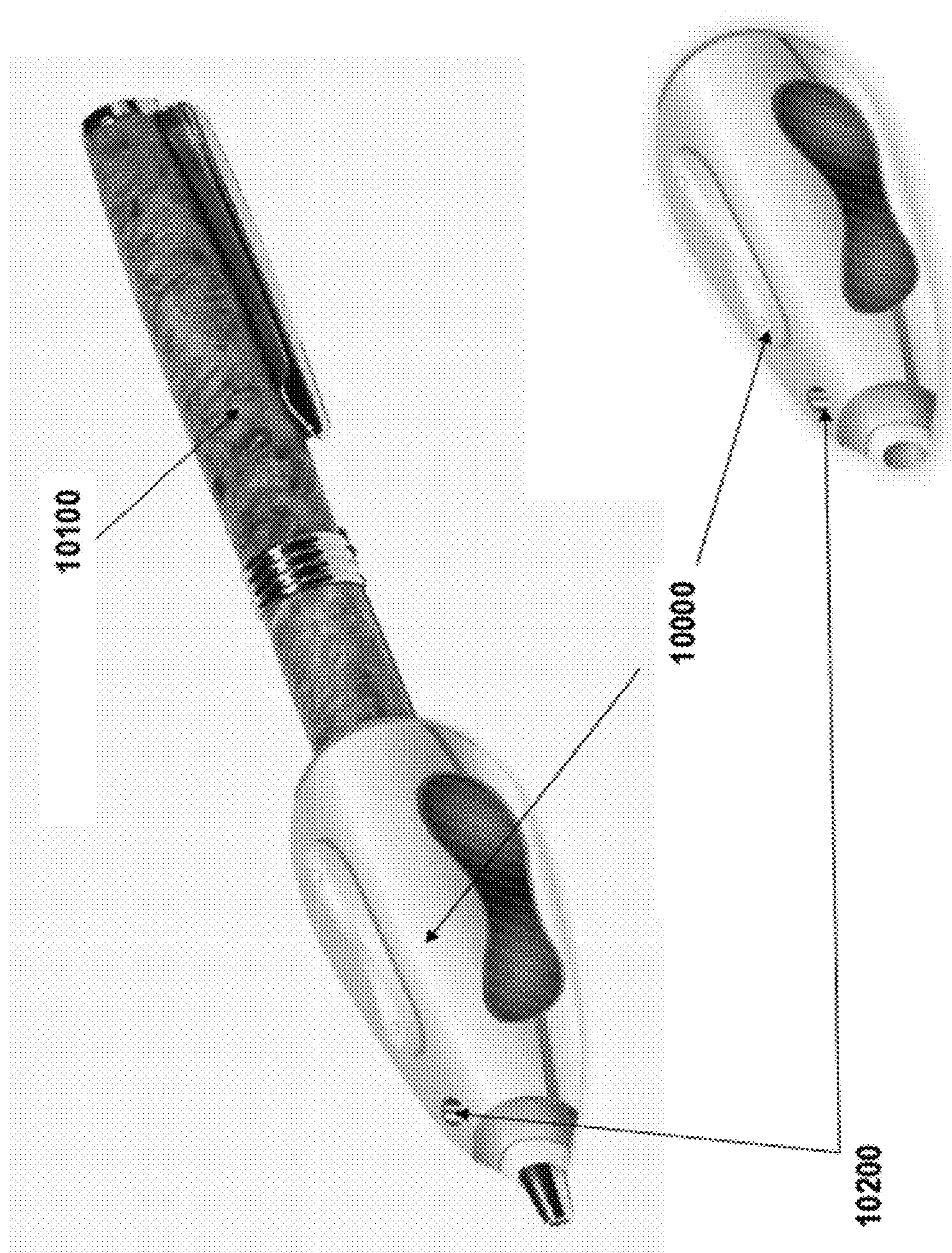
Figure 11A:
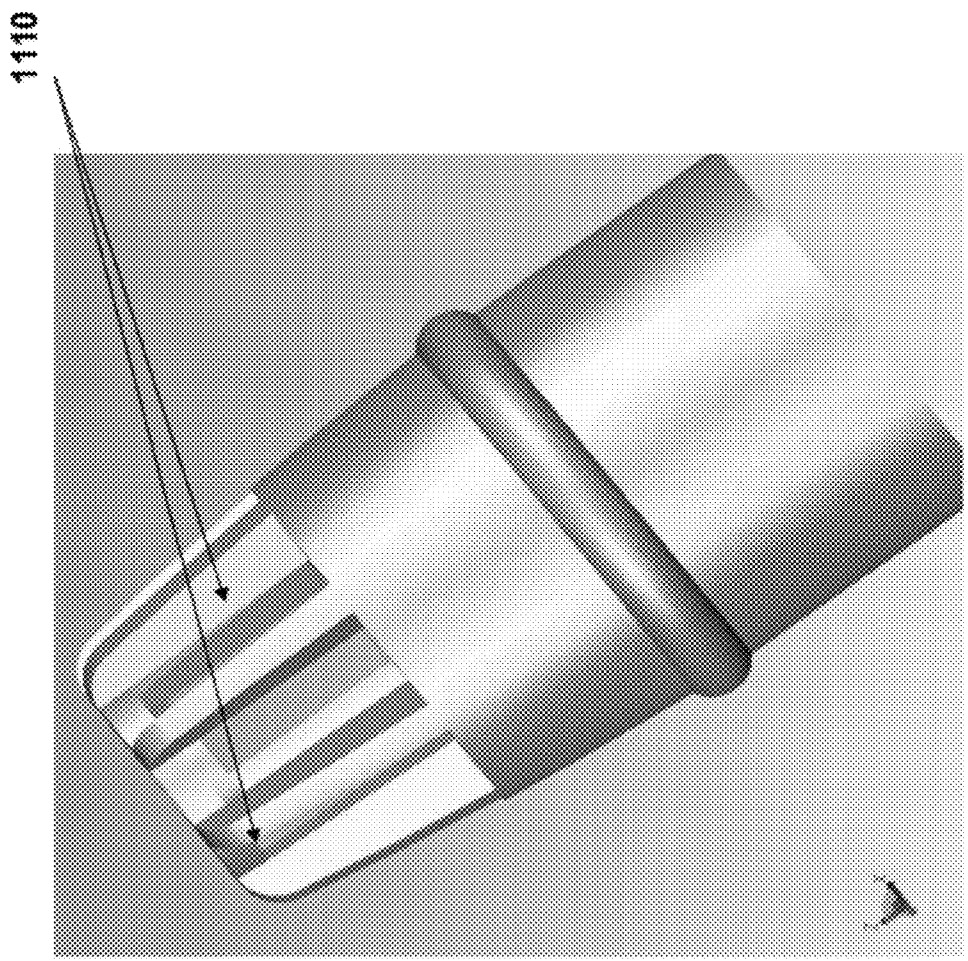
Figure 11B:
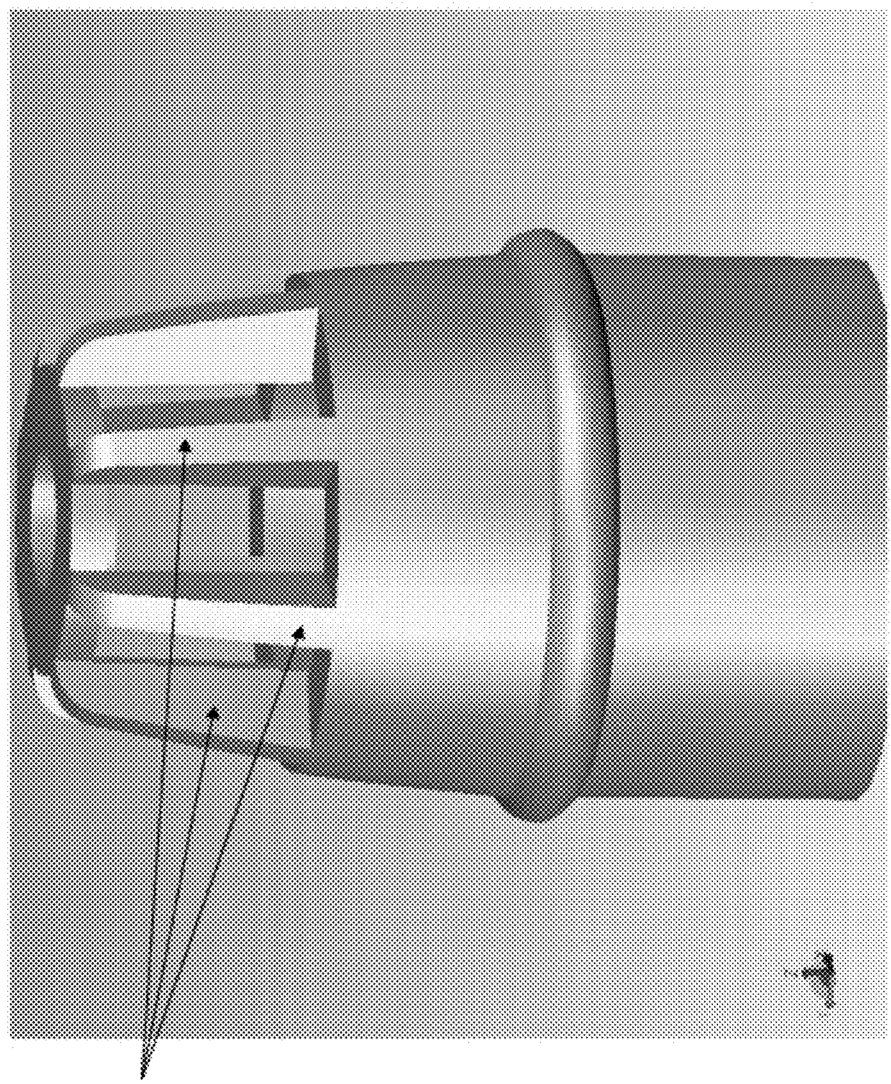
Figure 11C:
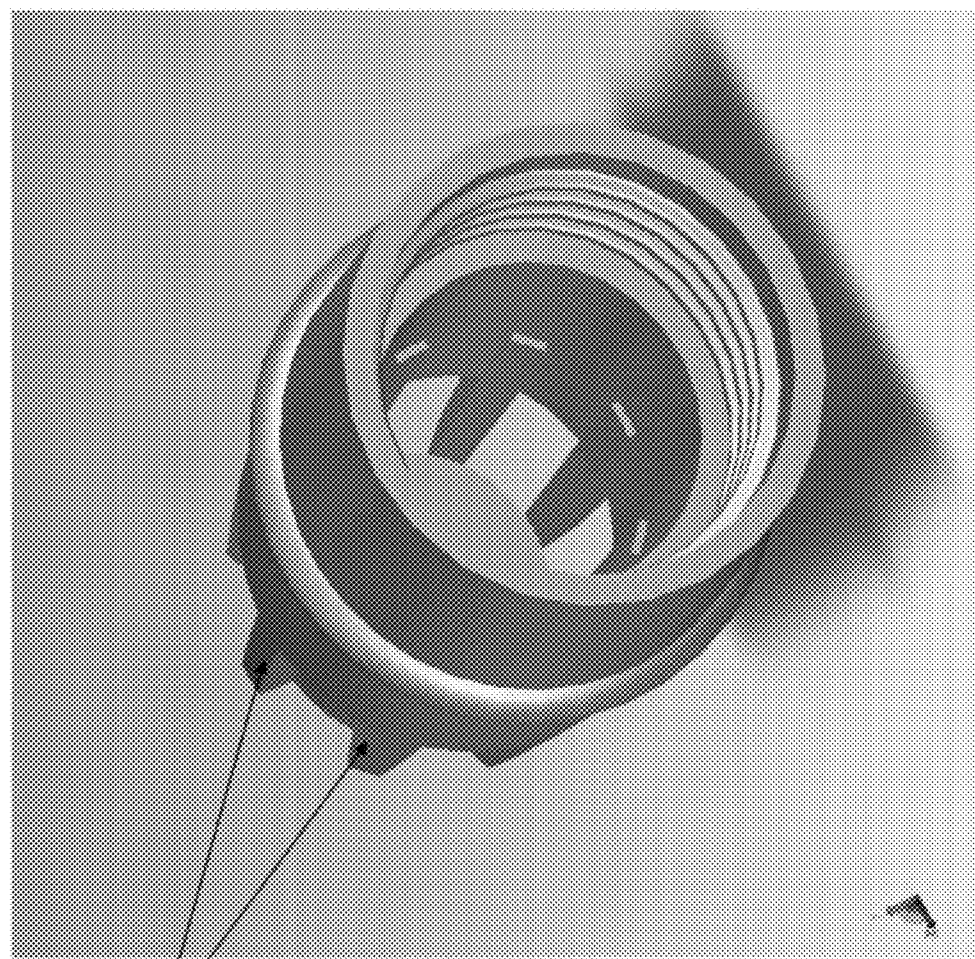
Figure 11D:
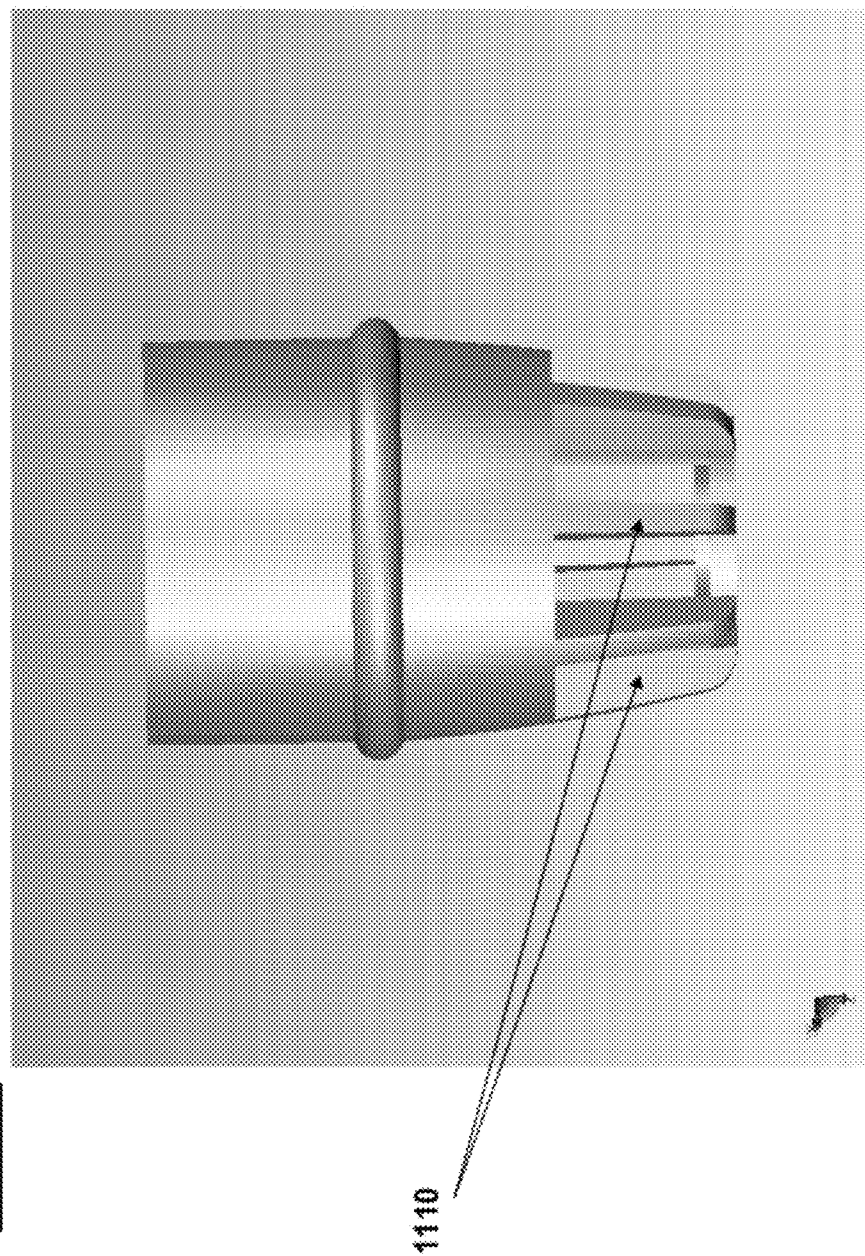
Figure 11E:
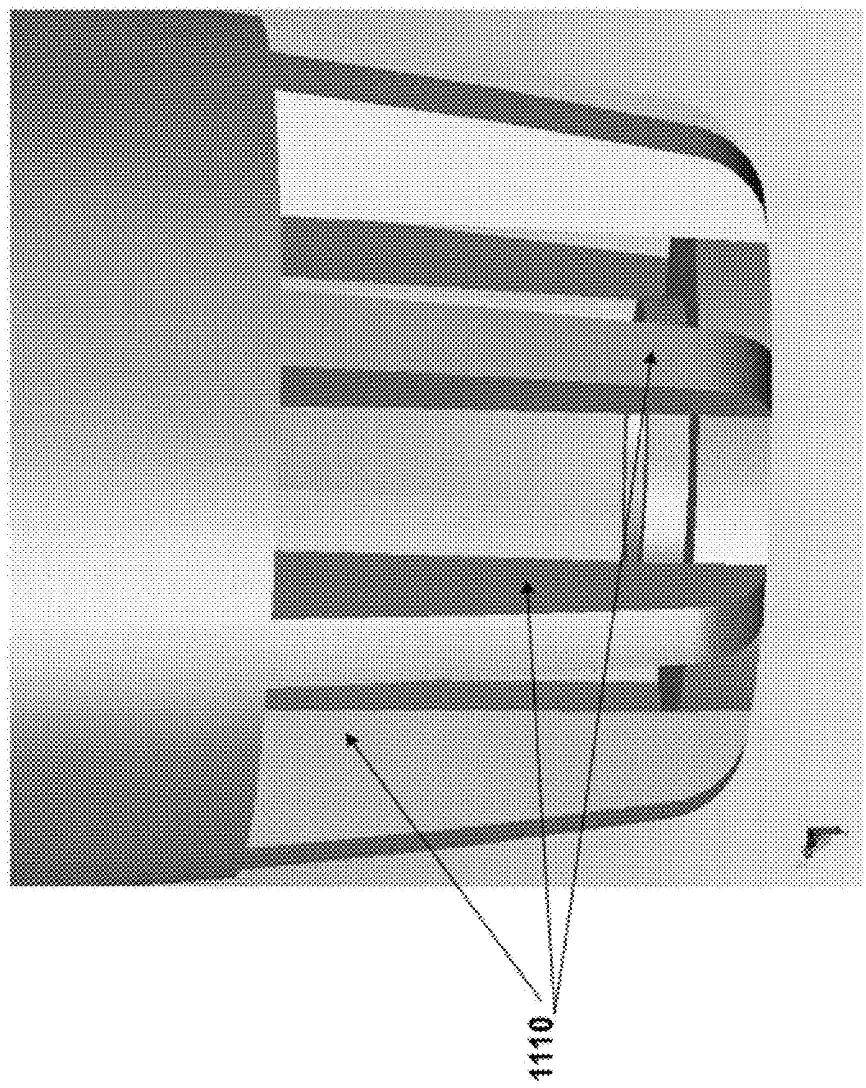

FIG. 10 is a diagram schematically illustrating a digital sleeve for a writing instrument, according to a preferred embodiment of the present invention.

FIGS. 11*a*-11*e* are schematic depictions of a digital pen's grating for a writing instrument, according to a preferred embodiment of the present invention.

Figure 12:
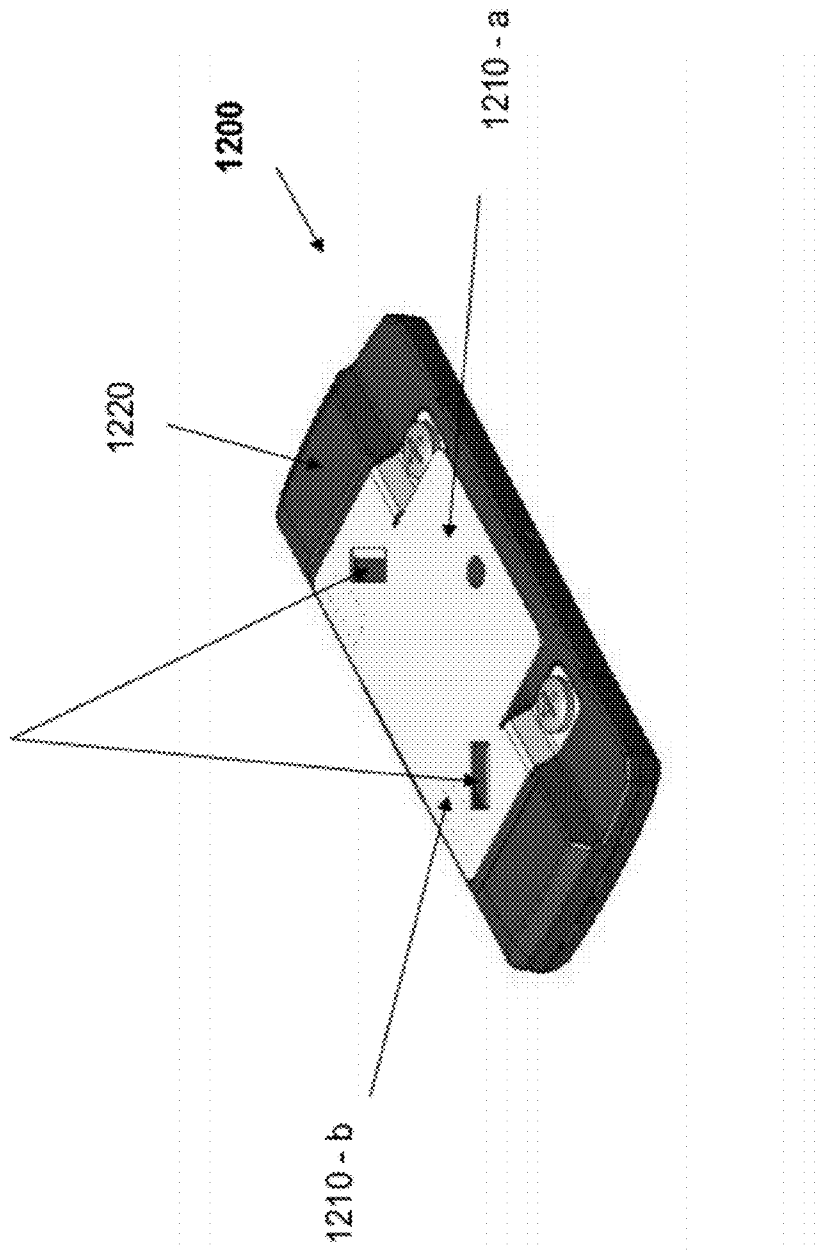

FIG. 12 is a schematic depiction of a first receiving unit for receiving an acoustic signal from a digital pen, according to a preferred embodiment of the present invention.

Figure 13:
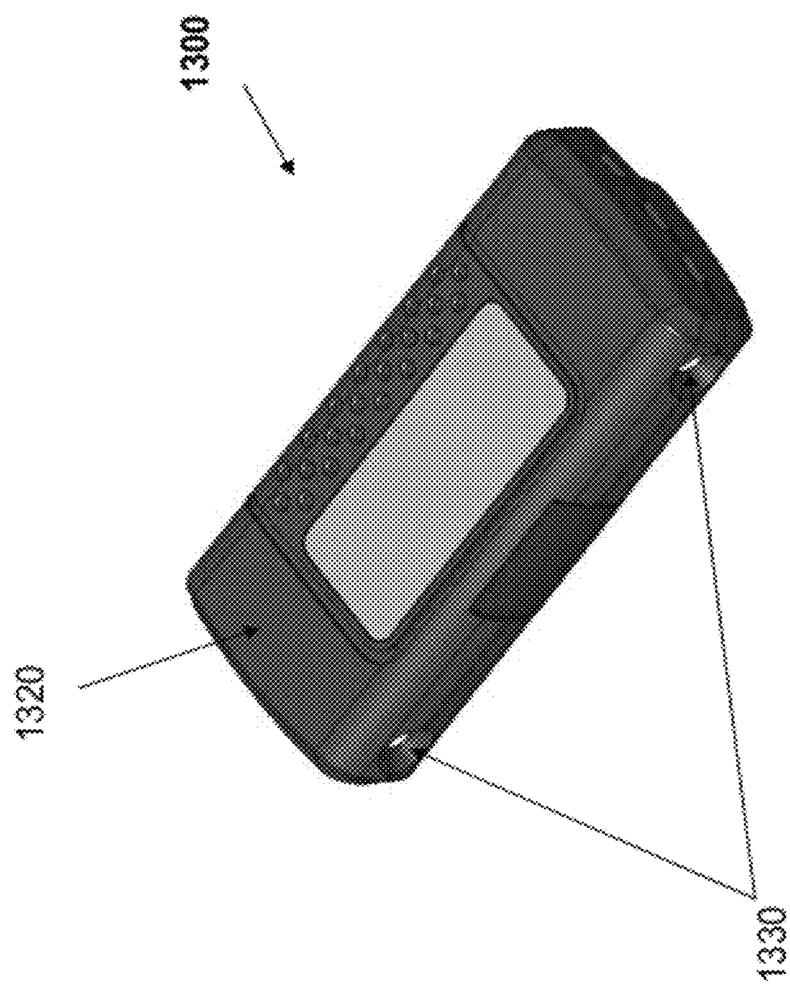

FIG. 13 is a schematic depiction of a second receiving unit for receiving an acoustic signal from a digital pen, according to a preferred embodiment of the present invention.

Figure 14:
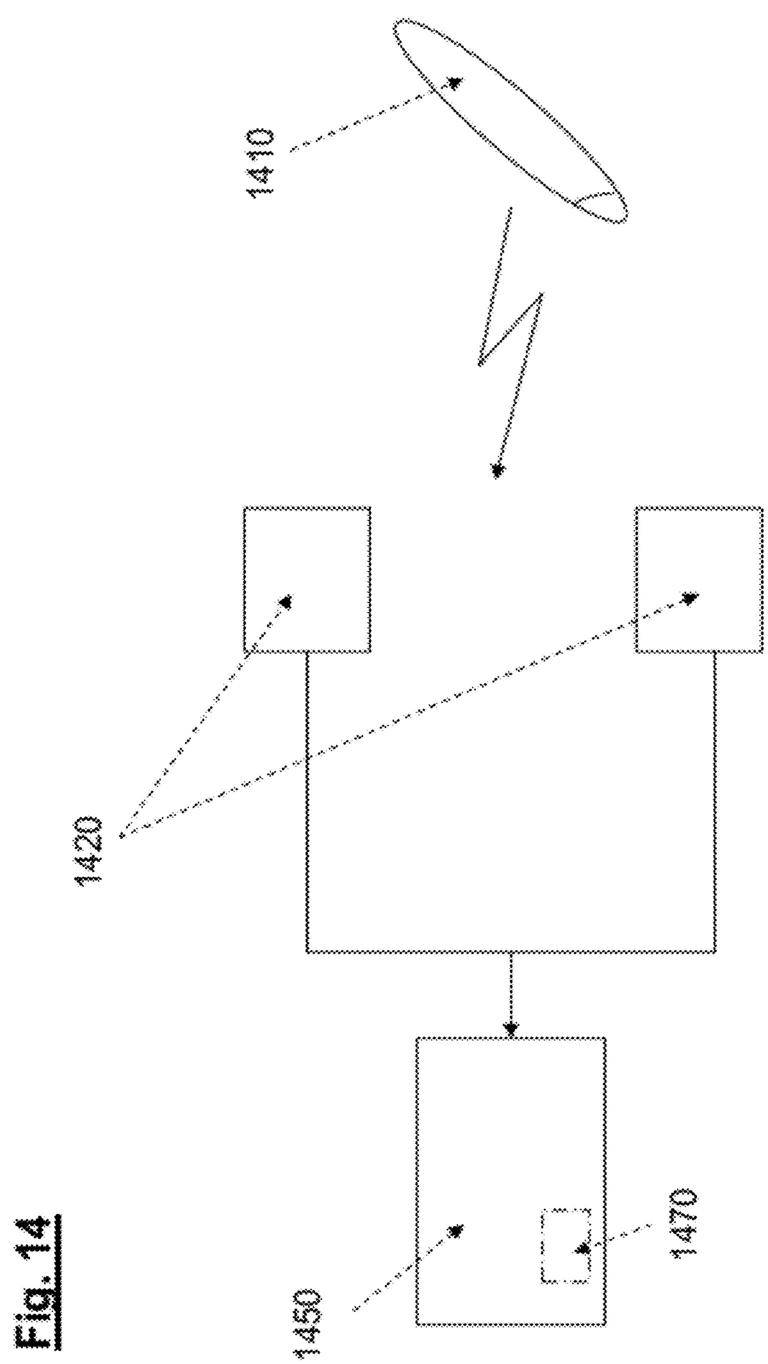

FIG. 14 is a simplified block diagram illustrating a digital pen system, according to a preferred embodiment of the present invention.

Figure 15:
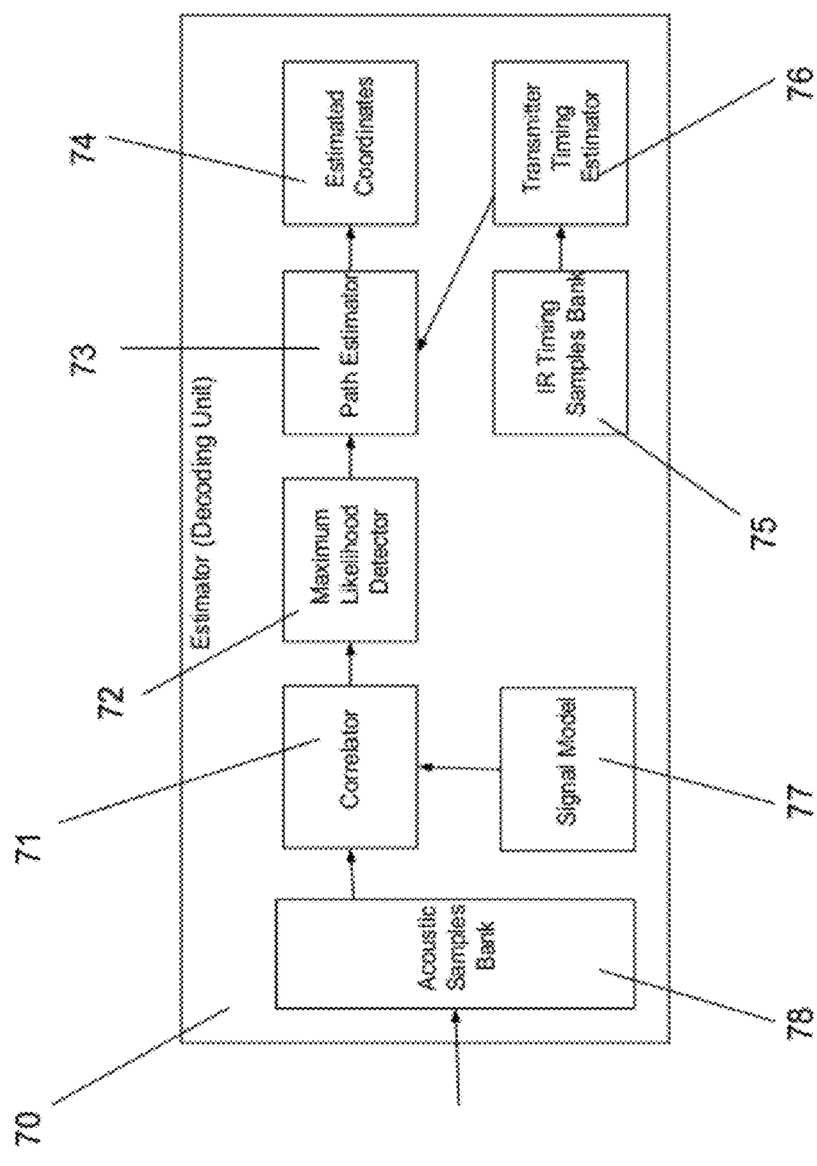

FIG. 15 is a simplified block diagram illustrating a decoding unit, according to a preferred embodiment of the present invention.

Figure 16:
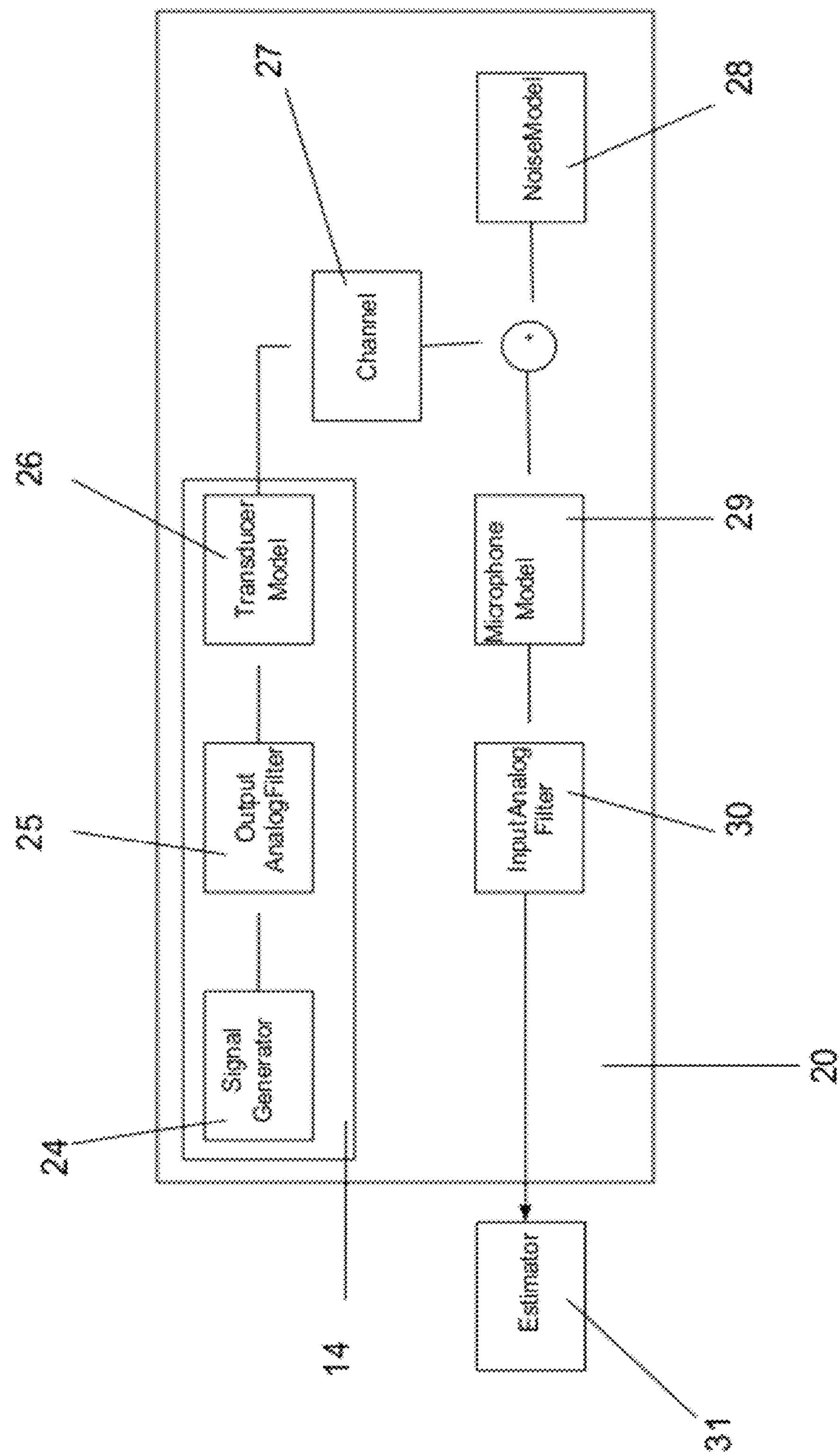

FIG. 16 is a simplified block diagram illustrating exemplary components of a mathematical model for incorporating into a maximum likelihood detector, according to a preferred embodiment of the present invention.

Figure 17:
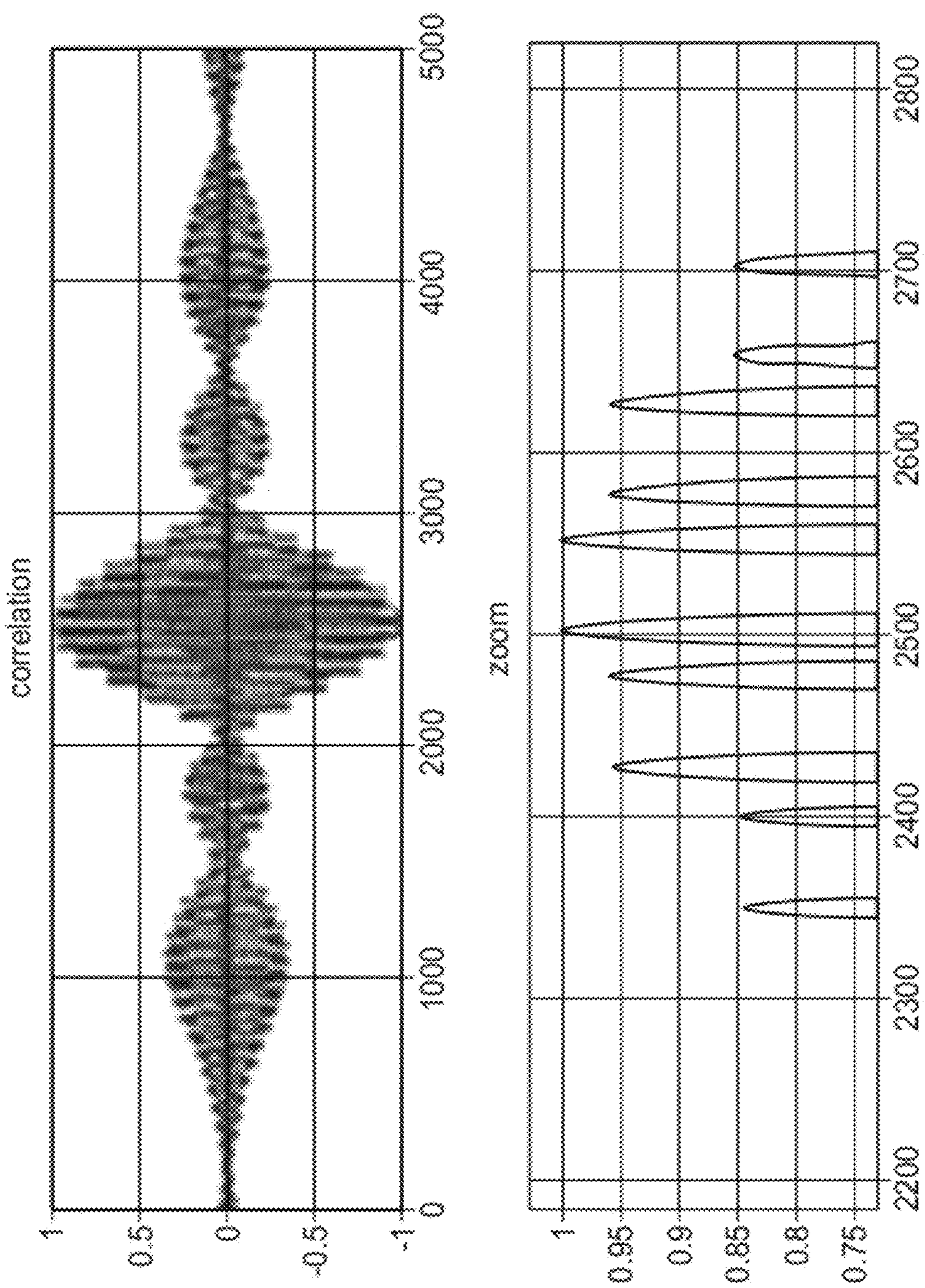

FIG. 17 is a two-part graph showing an exemplary correlation function, according to a preferred embodiment of the present invention.

DESCRIPTION OF THE PREFERRED EMBODIMENTS

The present embodiments comprise a digital pen, a digital sleeve, a receiving unit, and a digital pen system.

The principles and operation of a digital pen, a digital sleeve, a receiving unit, and a digital pen system according to the present invention may be better understood with reference to the drawings and accompanying description.

The present invention attempts to overcome drawbacks of traditional technologies, some of which are described hereinabove in the background and field of invention section. The present invention attempts to improve current technologies by introducing and implementing new ideas into the design of a viable product, be it a digital pen, a digital sleeve, a receiver for acoustic signals transmitted from a digital pen, or a digital pen system.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified block diagram illustrating a digital pen, according to a preferred embodiment of the present invention.

A digital pen 1000, according to a preferred embodiment of the present invention includes at least one acoustic transmitter 100, preferably deployed adjacent to the pen's tip, and an electric circuit 110 such as a flexible printed electric circuit board (PCB) 120 which includes a connection to an electric power source, such as a miniature battery.

Preferably, the acoustic transmitter 100 is an ultrasound transducer.

Optionally, the ultrasound transducer is a piezoelectric transducer which converts electrical energy into ultrasound signals. Piezoelectric crystals have the property of changing size when an electric voltage is applied to them. By applying an alternating electric voltage (AC) on a piezoelectric crystal, the crystal is caused to oscillate at very high frequencies producing ultrasound signals comprised of very high frequency sound waves.

Preferably, the ultrasound transducer is made of Polyvinylidene Fluoride (PVDF), which is flexible plastic polymer, bearing piezoelectric properties.

The acoustic transmitter 100 is electrically connected to the circuit 110, which may be detached from the transmitter 110, say to allow assembling an ink refill inside in the pen.

However, the acoustic transmitter 100 is too sensitive to allow heating for soldering, for electrically connecting the transmitter 100 to the electric circuit 110, or even the attachment of plastic to the transmitter 100. Though screwing the transmitter is optional, it is not suitable for fast high volume production.

A preferred embodiment of the present invention attempts to overcome the difficulty in electrically connecting the transmitter 100 and the electric circuit 110, using a resilient holder 120.

The resilient holder 120 presses the electric circuit 110 into contact with the acoustic transmitter 100, upon applying a mechanical pressure on the resilient holder 120, so as to electrically connect the electric circuit 110 and the acoustic transmitter 100.

Optionally, the resilient holder 120 is further configured to push the flexible PCB into a position, in order to allow the placement of components such as IR transmitters in certain positions.

Preferably, the resilient holder 120 facilitates the digital pen's 1000 being smaller than known in the art digital pens.

Reference is now made to FIG. 2*a* which is an exemplary depiction of a resilient holder deployed inside a digital pen, according to a preferred embodiment of the present invention.

A digital pen 2000 according to a preferred embodiment of the present invention has an elongated body terminating in a writing tip, a writing element 220 protruding from the writing tip, an acoustic transmitter 210 deployed adjacent to the writing tip, and an electric circuit 240 such as a flexible PCB 240 (flexible printed circuit board) or conductors.

The digital pen's writing element may be, but is not limited to an ink refill, a pencil tip, a marker, etc. The digital pen may also include an eraser. The digital pen may also allow a user to change the color of writing, say using the switch assembly, described in detail herein below. Optionally, the writing element is rather a sharpened tip which does not physically write.

Preferably, the digital pen 2000 further includes a resilient holder 250 pressing the flex PCB 240 (or the conductors) into contact with the acoustic transmitter 210, for electrically connecting the flex PCB 240 and the acoustic transmitter 210 (and to the pen body).

Preferably, the resilient holder 250 may be made of conductive material, in order to increase electrical conductivity between the Flex PCB 240 and the acoustic transmitter 210.

Optionally, the electric conductivity between the Flex PCB 240 and the acoustic transmitter 210 may be increased by deploying gold contacts on the resilient holder 250.

The resilient holder 250 secures electrical contact between the Flex PCB 240 and the acoustic transmitter 210. Optionally, as a result of mechanical pressure applied on the resilient holder 250, say from the pen's housing.

In a preferred embodiment, the resilient holder 250 is in the shape of a "U": solid above and open below, such that the pen body is kept tight by the bottom part of the resilient holder 250. The "U" shaped resilient holder 250 comprises a base and extensions arising perpendicularly from the base, and is configured for location of the flex PCB 240 or any other first electric circuit, and a second electric circuit, within the confines of a housing. The resilient holder 250 brings about an electric contact between the two electric circuit, due the confinement within the housing, thereby connecting the two circuits. By connecting the two circuits, the resilient holder 250 electrically connects the flexible PCB 240 and the acoustic transmitter 210.

Preferably, the resilient holder 250 has some elasticity so as to enable easy assembly, by putting all parts and sliding the resilient holder 250 to position. The mechanical force is kept by elastic lugs on the upper part consisting of the base hereinabove. The elastic lugs push the holder up (while the bottom part is secured to the pen's body as explained hereinabove), as explained hereinabove.

Reference is now made to FIG. 2*b* which shows an exemplary a digital pen having a resilient holder, according to a preferred embodiment of the present invention.

A digital pen 2000 has a resilient holder 290, as described hereinabove. The resilient holder 290 further has leaf springs 292. The leaf springs 292 are configured to apply pressure on an acoustic transmitter's ribbon, thereby connecting the acoustic transmitter to the flexible PCB 295, as described hereinabove.

Reference is now made to FIG. 3 which an exemplary depiction of a digital pen having a switch assembly comprising two switches, according to a preferred embodiment of the present invention.

A digital pen 3000, according to a preferred embodiment of the present invention includes at least one acoustic transmitter 310, preferably an ultrasound transducer.

The digital pen 3000 further comprises a switch assembly 320 having at least two switches. The digital pen 3000 has a certain mode which a user may select by pressing at least two of the switches substantially simultaneously.

Optionally, the switch assembly 320 is mechanically designed, according to known in the art techniques, with a position associated with the certain mode of the pen. Preferably, the position is accessible only when the user presses the two switches of the switch assembly 320 simultaneously, or almost simultaneously.

Reference is now made to FIG. 4*a*, which is a block diagram schematically illustrating an exemplary switch assembly mechanical design, according to a preferred embodiment of the present invention.

A switch assembly, according to a preferred embodiment of the present invention, has two switches 410,420, mounted on a switching rod 450. The switching rod is balanced about a fulcrum 470. Preferably, the fulcrum 470 is urged up by a spring.

A user may push the first switch 410, thus putting the assembly in a first position (a), or push the second switch 420, thus putting the assembly in a second position (b), or toggle between the two positions (a,b).

When a user pushes the two switches 410,420, at the same time, or almost at the same time, the pressure applied on the two switches 410,420 simultaneously pushes the fulcrum 470 against the spring, and puts the assembly in a third position (c) where both switches are pressed. The third position may be associated with a certain mode, as described hereinabove.

Optionally, the switch assembly 320 is electrically designed, according to known in the art techniques, with a position associated with the certain mode of the pen. The position is accessible only when the user presses the two switches of the switch assembly 320 substantially simultaneously.

Reference is now made to FIG. 4*b*, which a block diagram showing a first exemplary cover element for a switch assembly, according to a preferred embodiment of the present invention.

Switch assembly 320, may further have cover element 4000. The cover element 4000 has right and left protrusions 4100 (or regressions), guiding a user press one of the two switches 410,420, as explained in greater detail hereinabove. The cover element 4000 further has a central protrusion 4200 (or regression), guiding the user, to apply a pressure substantially simultaneously on the two switches 410,420, thus bringing the switch assembly into the third position, described hereinabove.

Reference is now made to FIG. 4*c*, which is a block diagram showing a second exemplary cover element for a switch assembly, according to a preferred embodiment of the present invention.

Cover element 4500 is mount on the switch assembly, such that the protrusions (regressions) are positioned above their two switches 4520, described hereinabove.

Reference is now made to FIG. 5*a*, which is a simplified block diagram depicting a touch switch, according to a preferred embodiment of the present invention.

A digital pen according to a referred embodiment of the present invention includes a smooth contact switch, configured to actuate the digital pen upon applying a mechanical pressure on the smooth contact switch.

The smooth touch switch is assembled inside the digital pen, such that the mechanical pressure is applied on the smooth contact switch when the pen touches a surface, such as a sheet of paper, say when a user writes using the digital pen.

Preferably, the applied pressure may be very small, preferably less than twenty five grams. More preferably, the switch activation travel distance is very small (say, less than 0.1 mm), and not sensed by the user who uses the pen.

The smooth touch switch may be mounted on an open electric circuit, such as a flexible printed circuit board (PCB), a regular circuit, or on two detached circles of conductive material, etc As a result, no wires or ribbons are needed to connect the switch to the electrical circuit.

In a preferred embodiment, a concentric adhesive 510 with electrical conduction properties is applied on a resilient element 530, electrically connected to one side of an open electric circuit.

The upper part of the smooth touch switch is the flat and compressible resilient element 530 having conducting properties, mounted on the adhesive 510, as shown in a cross sectional view (5*a*-2) along the AA line of the bottom view (5*a*-1). Optionally, the resilient element is made of a conductive material or the conductive properties are given to the resilient element 530, by a adding an additive, such as a conductive ink or glue to the resilient element 530.

A pressure in the center of the upper part of the resilient element 530 of the smooth touch switch compresses the resilient element 530 into a position forming an electric path from a second side of the open electric circuit, through the resilient element 530, through the concentric adhesive 510, and to the first side of the electric circuit, thus closing the electric circuit, thereby actuating the digital pen.

The actuating pressure is controlled by the thickness of the concentric adhesive 510, inner diameter of the concentric adhesive 510 and thickness of the resilient element 530.

Optionally, the resilient element is made of Polyethylene Terepthalate—(PET) material covered with conductive ink, and the concentric adhesive is a very thin layer, of no more then 0.1 mm, and made of 3M™ Z-Axis, or similar products. Optionally the resilient element 530 is made of conductive metal.

Reference is now made to FIG. 5*b* which is simplified block diagram, illustrating an adhesive having a vent, according to a preferred embodiment of the present invention.

Preferably, the adhesive 5100 used in the smooth touch switch, described hereinabove, includes vent holes 5150, for relieving air pressure trapped inside the cavity formed by the resilient element 530, the adhesive, and the electric circuit closed by the smooth touch switch upon compressing the resilient element 530.

Reference is now made to FIG. 6*a*, which is a simplified diagram illustrating a first digital pen having a changeable cover element, according to a preferred embodiment of the present invention.

Preferably, a digital pen according a preferred embodiment of the present invention, has an inner structure which holds the functional parts together and a housing having a changeable cover element (skin).

The inner part may hold an acoustical transducer, IR emitters, an electric circuit such as a flexible PCB, switches, etc. The housing covers the inner part and has some mechanical interfaces which allow its connection to the inner part. The housing may have additional functional properties, such as a battery holder.

In a preferred embodiment, there is introduced a variety of colorful and fashioned changeable cover elements, thus providing a range of covers (skins) for the digital pen.

Optionally, a manufacturer of the pen assembles the pen with one cover element of a variety of cover elements and the end user does not change the cover element. Preferably, an end-user is allowed to change the cover element of the housing, thus giving the digital pen different appearance and different feel or texture For example, a digital pen 6100 has a housing which includes a central changeable cover element (skin) 610, connected to battery support chassis 611 on one side, and to a pen tip 612, on the other side. Optionally, the central changeable cover element (skin) 610 is connected to the battery support chassis 611 and the pen tip 612, utilizing snap locks 615, visible or hidden, as known in the art.

Reference is now made to FIG. 6*b*, which is a simplified diagram illustrating a second digital pen having a changeable cover element, according to a preferred embodiment of the present invention.

a digital pen 6200 has a housing which includes a changeable cover element (skin) 6210, connected to a pen tip 6220.

Reference is now made to FIG. 6*c*, which is a simplified diagram illustrating a third digital pen having a changeable cover element, according to a preferred embodiment of the present invention.

a digital pen 6300 has a housing which includes a changeable cover element (skin) 6310, connected to a battery cover 6320.

Reference is now made to FIG. 6*d*, which is a simplified diagram illustrating a fourth digital pen having a changeable cover element, according to a preferred embodiment of the present invention.

a digital pen 6400 has a housing which includes an upper changeable cover element (skin) 6410, connected to a lower cover 6420.

Preferably, the digital pen is a retractable digital pen allowing covering the writing element at the tip of the pen, say at the tip of an ink cartridge deployed inside the pen, (or stylus, or pencil).

Reference is now made to FIG. 7*a* which a simplified block diagram illustrating a first retractable digital pen according to a preferred embodiment of the present invention.

According to a preferred embodiment, the digital pen 700 has a rotating part 710 which moves forward or backwards when a user rotates the part 710.

The rotating part 710 moves forward and covers a writing element 720, protruding from the tip 715 of the digital pen 700, when the user rotates the part 710 in one direction. The rotating part 710 moves backwards, and exposes the writing element 720, as the user rotates the part 710 in an opposite direction.

Optionally, the rotational movement of the rotating part 710 is transformed into a linear movement where the rotating part 710 moves forward, for covering the writing element 720, or backwards, for exposing the writing element 720. The transformation may be facilitated by a helical track, guiding the rotating part 710, as known in the art.

Reference is now made to FIG. 7*b* which a simplified diagram illustrating a second retractable digital pen according to a preferred embodiment of the present invention.

A digital pen's housing includes a skin 7120 and a retractable tip 7110. The retractable tip 7110 is connected by a spiral mechanism 7100 to the skin 7120. The spiral mechanism 7100 causes a linear movement of the tip in and out. The rotation motion is applied by the user between the tip 7110 and the skin 7120.

Reference is now made to FIG. 8*a* which a simplified block diagram illustrating a third retractable digital pen, according to a preferred embodiment of the present invention.

A retractable digital pen 800 comprises an elongated housing 805, covering an elongated body 820 terminating in a writing tip, wherefrom a writing element 810, such as a tip of an ink refill protrudes.

The elongated body 820 may be moved forward, to expose the writing element 810, and backwards to cover the writing element inside the housing 805 of the digital pen 800.

Optionally, the elongated body 820 is urged backwards by a spring 830, thus pushing the elongated body 820 into a position where the writing element 810 is covered by the housing.

Preferably, the elongated body 820 is securable into a position where the writing element 810 is exposed, by a securing means 850. Optionally, there may be used a snap, a lock, etc, for locking the elongated body on the edge of the housing 805.

Optionally, a digital pen, according to a preferred embodiment may have moving parts, such a refill, a skeleton, a tip, a battery house, any other part, or a combination thereof. The movement between the moving parts may be facilitated utilizing designs similar to the designed described above, using FIG. 7-8.

According to a preferred embodiment of the present invention, there are put several infrared (IR) emitters, on several points of the digital pen for more robustness.

As a result, if one of the IR emitters is covered, say by the hand of a user while holding the digital pen, the other parts maintain the link with a receiver.

Examples of the possible points on the digital pen where the IR emitters may be deployed include, but are not limited to: the bottom part of the digital pen, the upper part, on the top of the pen, on a flexible PCB installed in the digital pen (as described hereinabove), etc.

Preferably, the housing of the digital pen includes a soft material such as rubber, so as to provide better convenience for a user holding the digital pen.

Reference is now made to FIG. 8*b* which a simplified block diagram illustrating a fourth retractable digital pen, according to a preferred embodiment of the present invention A digital pen may have a retractable skeleton 7250, pushed by a button 7270 mounted on top of the digital pen, utilizing and a locking mechanism 7200.

Reference is now made to FIG. 9 which is a block diagram schematically illustrating a digital pen having two acoustic transmitters according to a preferred embodiment of the present invention.

A digital pen 900 may have two acoustic transmitters 930. Installing two acoustic transmitters in a digital pen may have several advantages, which may include, but are not limited to the following:

1) Allowing the receiver to estimate the five dimensional (5D) location of the pen which includes the three dimensional location, and leaning angles of the digital pen, or a six dimensional (6D) location of the pen, which includes the five directional (5D) location as well data relating to rotation of the digital pen.
2) Estimating more accurately the writing element's position and compensating for the distance difference between the transducer and position of the writing element.
3) Allows gaming functions, using the digital pen as a joystick.

Reference is now made to FIG. 10 which is a diagram schematically illustrating a digital sleeve for a writing instrument, according to a preferred embodiment of the present invention.

The digital sleeve 1000 comprises an acoustic signal transmitter, for transmitting an acoustic signal. The digital sleeve 1000 may also comprise an electric circuit, a power source, or other elements, as described for a digital pen hereinabove.

A digital sleeve 1000, according to a preferred embodiment, may be mounted on a regular writing instrument 1100, such as a pen, a pencil, a marker, etc.

According to a preferred embodiment of the present invention, the digital sleeve 1000 may be worn on a finger. For example, Epos Technologies™ provides a stylus-at-your-fingertip product.

Preferably, the digital sleeve 10000 further includes a writing sensor 10200. The writing sensor 10200 is configured for detecting a movement (or a friction) of the writing device 10100, relative to the digital sleeve 10000 mounted thereon.

That is to say, as a user, holding a pen mounted with the sleeve 1000, starts writing with the pen, a relative movement (or friction) occurs between the pen touching a paper and the sleeve 1000. The relative movement (or friction) is sensed by the writing sensor 10200. The writing sensor 10200 in turn, actuates the acoustic transmitter, through electric circuitry. Then, the acoustic transmitter transmits the acoustic signals, say to a receiving unit, as described in greater detail for a digital pen system herein below.

Reference is now made to FIG. 11*a-e*, which are schematic depictions of a digital pen's grating for a writing instrument, according to a preferred embodiment of the present invention.

Typically, an acoustic transmitter, specifically—an ultra sound transducer has some irregularities. The irregularities make the transducer not entirely omni directional.

The irregularities result from a part of the transducer having an inherent defect, because the transducer is made from a rectangular foil laminated to form a cylinder. The lamination forms a passive part which does not radiate acoustic energy. The inherent defect causes the signal in front of the defect to be much weaker than in front of other parts of the ultrasound transducer.

Typically, the position of the digital pen is determined utilizing an algorithm, based on a measurement of TOA (time of arrival) of the acoustic signals from the acoustic transmitter. Usually the algorithm compares the TOA of the signals with IR signals transmitted from the digital pen.

As a result of the inherent defect, the sum of the signals received at a given point in the space surrounding the acoustic transmitter has a phase shift, in comparison to other points at a similar distance away from the acoustic transmitter.

A digital pen, according to a preferred embodiment, includes an acoustic wave guide, positioned adjacent to an acoustic transmitter of the digital pen.

Preferably, the acoustic wave guide comprises a plurality of fins 1110 radiating outwardly in a direction away from the acoustic signal transmitter.

More preferably, the fins 1110 are positioned so as to spatially divide the space surrounding the acoustic transmitter into directional sectors.

The fins 1110 substantially isolate acoustic signals transmitted by the acoustic transmitter through one of the sectors from acoustic signals transmitted from the acoustic transmitter through the other sectors.

That is to say, to eliminate the shift in location, the fins 1110 are positioned so to as to divide the space around the acoustic transmitter into sectors, such that each sector is decoupled or isolated from the other sectors.

As a result of the division of space around the acoustic transmitter into significantly isolated sectors, the phase shift is significantly eliminated. The elimination of phase shift may improve the results of acoustic signal correlation based position decoding techniques. However, the amplitude of the sum of signals transmitted through each point in one of the sectors around the acoustic transmitter is reduced, as signals from the other sectors are significantly eliminated from the sector.

Optionally, the grating around the acoustic transmitter may be designed differently than the above described fin design.

For example, the grating may comprise a spiral opening keeping a single opening, a grating coming upwards combined with a grating coming downwards (keeping an opening to free air in between), etc.

According to a preferred embodiment of the present invention, there is provided a receiver configured to receive acoustic signals transmitted from a digital pen, to be used for determining location of the digital pen, say for automatically digitizing hand writing carried out using the digital pen.

Reference is now made to FIG. 12 which is a schematic depiction of a first receiving unit for receiving an acoustic signal from a digital pen, according to a preferred embodiment of the present invention.

A receiving unit 1200, configured to receive acoustic signals from a digital pen may have a metal plate 1210 mounted on the body 1220 of the receiving unit, for securing the receiving unit 1200 to a sheet of paper.

Pressing the metal plate one end 1210-*a* makes the other end 1210-*b* open a gap between the other end 1210-*b* and the body 1220 of the receiving unit 1200. Through the opened gap, a sheet of paper may be inserted between the plate's end 1210-*b* and the body 1220 of the receiving unit 1200.

Releasing the metal plate pressed end 1210-*a* makes the other end 1210-*b* get back to its natural position and embed a force on the paper sheet which is pressed between the plate's end 1210-*b* and the body 1220 of the receiving unit 1210.

The metal plate 1210 and the body 1220 of the receiving unit 1200 may have additional non-flat surface properties (such as rubber pads) which allow more friction between the paper and the receiving unit's body 1220.

Preferably, the metal plate 1210 may be shaped, so as to cause a slight deformation of the paper, in order to have a better grip of the paper sheet.

One or more receiving unit(s) 1200 may be fit on the paper sheet's center, or on the sheet's edges.

Preferably, the receiving unit body 1200 and plate have stoppers 1212 that fit the 90 degrees of a paper sheet's corner (and hold the receiving unit at 45 degrees).

The placement of the receiving unit 1200 on the corner of the paper sheet instead on the sheet's middle has several benefits, such as: Repeatability, Accuracy—a receiving unit placed on the corner has a better perspective, improving its accuracy, Less dead zones—as the operating angle of a receiving unit placed at the corner of the paper sheet is much smaller than when a receiving unit is place in the middle of the paper.

Reference is now made to FIG. 13 which is a schematic depiction of a second receiving unit for receiving an acoustic signal from a digital pen, according to a preferred embodiment of the present invention.

A receiving unit 1300, according to a preferred embodiment of the present invention includes two microphones 1330.

Optionally, the two microphones are ultrasound receivers, as known in the art.

Preferably, the two microphones are electret microphones or alternatively MEMS microphones. Electret microphones are miniature microphones that work on condenser microphone principles, as known in the art, but have permanently charged polymer diaphragms. Electret microphones have miniature preamplifiers built in, and require low voltage direct current (DC) power (typically from a 1.5 to 18 volts battery).

Electret microphones are widely used in hand held devices—such as mobile computer games, mobile phones, etc.

The receiving unit 1300 further includes an electric circuit.

The electric circuit is configured to extract ultrasound signal, received by the microphones 1330, say by implementing frequency down conversion, signal filtration, signal amplification techniques, or other methods.

Some of the methods used by the electric circuit are described in greater detail in the applicant's International Application No. PCT/IL03/00309, entitled "Method and system for obtaining positional data", filed on Apr. 14, 2003.

According to a preferred embodiment of the present invention, the two microphones 1330 are positioned in a distance of less then 65 mm from each other.

The signals received form the two microphones 1330 positioned less than 65 mm away from one another, may be processed for generating positional data relating to the digital pen.

The processing may be carried out using decoding methods, say utilizing models of the transmitted and received signals as described in grater detail herein below.

According to a preferred embodiment of the present invention, a processor, connected with one or more receiving unit(s), is configured to process acoustic signal, received at the receiving unit(s), for determining presence of the digital pen in a predefined area.

Preferably, the processor may be configured to trigger a predefined functionality when a user places the digital pen in a predefined area.

Optionally, the user may be provided a printed map or menus, and position the receiving unit(s) on the map or menus. When the user positions the digital pen on an icon, representing the predefined area, printed on the paper, the digital pen is present in the predefined area. Consequently, the predefined functionality is triggered by the processor.

For example, the user may be provided a printed menu having drawn icons such as an eraser, a marker, etc. The user may deploy the receiving unit(s) on the printed menus. If the user places the digital pen on the eraser icon, the processor switches into an erasing mode and the digital pen functions as an eraser. If the user places the digital pen on the marker icon, the processor switches into a marker mode and the digital pen functions as a marker.

Preferably, the housing of 1320 of the receiving unit 1300 is used as an assembly jig. A worker assembling the receiving unit 1300 may insert the microphones 1330 into their position inside the body 1320, and solder a printed electric circuit board (PCB) into a position inside the body 1320. The worker may then connect the PCB to the microphones 1330.

Optionally, the receiving unit 1300 may be removable attached to another item, such as a paper clipboard used by a student, etc.

Preferably, the housing 1320 of the receiving unit 1300 includes a changeable cover element.

The changeable element may provide a user of the receiving unit 1300, a manufacturer of the receiving unit 1300, or both, with the option to change the color and appearance of the receiving unit 1300.

Optionally, the housing 1320 of the receiving unit 1300 may also house a serial interface cable, rolled in and out from the housing. Preferably, a connector at the end of the interface cable may be clipped to the housing 1320. The housed interface cable helps to keep the receiving compact.

Reference is now made to FIG. 14 which is a simplified block diagram illustrating a digital pen system, according to a preferred embodiment of the present invention.

A digital pen system 1400 includes a digital pen 1410, and one or more digital pen receiver(s) 1420, as described in greater detail hereinabove.

The system 1400 further includes a processor 1450, communicating with the receiving units(s) 1420.

The processor 1450 is configured to process acoustic signals, transmitted from the digital pen 1410 and received by the receiving unit(s) 1420.

Through the processing of the received acoustic signals, the processor 1420 determines the location of the digital pen 1410.

Optionally, the processing further includes determining the presence of the digital pen 1410 in a predefined area, and triggering a predefined functionality upon the determined presence in the predefined area, as described hereinabove.

According to a preferred embodiment of the present invention, the location of the digital pen according to the acoustic signals transmitted from the digital pen is carried out utilizing a decoding algorithm. The decoding algorithm may be implemented in a decoding unit 1470. The decoding unit 1470 may be implemented as a part of the processor 1450, as a part of a device communicating with to the processor 1450, as a part of the receiving unit(s) 1420, etc.

Reference is now made to FIG. 15 which is a simplified block diagram illustrating a decoding unit, according to a preferred embodiment of the present invention.

A decoding unit 70 includes a maximum likelihood detector 72, which uses a channel mathematical signal model 77, a correlator 71, a maximum likelihood detector, a path estimator and transmitter timing estimator.

The maximum likelihood detector 72 generates most likely distance data, relating to the distance of the digital pen from a receiving unit, based on the acoustic signals received from the digital pen, and feeds the path estimator 73 with the most likely distance data.

The maximum likelihood detector 72 estimates the transmitter position and feeds the path estimator 73 with several options for location of the transmitter, each option having a probability associated therewith. The path estimator 73 further uses previously calculated possible positions from a sampling bank 75 (and their probabilities), provided by a transmitter timing estimator 76, in order to choose the right estimated coordinates 74 of the position of the transmitter The decoding algorithm is used to convert digitized versions of the digital pen's acoustic signals into position coordinates for passing to a local computer operating system, a computer application, or the like.

The decoding algorithm preferably takes into account the relatively low sampling frequency capabilities likely to be available, by carrying out frequency down conversion. Preferably, the path estimator 73 uses known in the art methods of interpolation, for compensating for the relatively low sampling rate.

In addition, the algorithm preferably includes an ability to handle noise.

The algorithm is preferably adapted for other specific issues, involved in the handling of the acoustic signals transmitted from the digital pen.

Traditional position location methods concentrate on the use of very short and energetic acoustic signals, as the location signal. In order to achieve good resolution, the traditional methods dictate high sampling frequencies, typically higher than 400 KHz, in order to be able to find such short location signals and not miss them entirely.

By contrast, the present embodiments preferably do not use sampling rates higher than 44.1 KHz, since such frequencies are incompatible with the installed base of sound processing equipment, such as the electret microphones.

Furthermore, it is recommended to keep the beacon signal sound frequency higher than 20 KHz, that is within the ultrasonic range, so that users do not hear it.

In another preferred embodiment of the invention, the sampling rate may be higher than the 44.1 KHz, say 100 KHz. This is possible by a receiving unit which is configured for a high sampling rate. The higher sampling rate enables better noise rejection of the audio band and higher bandwidth of the transmitted signal.

A preferred embodiment of the present invention uses a solution in which data is modulated over an ultrasonic carrier signal or waveform. The data can be frequency modulated (FM), or phase modulated (PM), onto the carrier comprising the ultrasonic signal. Optionally, other known method may be used.

The decoding algorithm preferably decodes the modulated signal and reconstructs the original position-information bearing signal from the results of sampling thereof. In the present embodiment, it is preferred to use band-limited signals in order to achieve a desired resolution level.

Preferably, continuous wave (CW) modulations such as spread spectrum and frequency hopping are used in acoustic position finding, to overcome reverberation and multi-path effects.

A preferred embodiment of the present invention uses the maximum likelihood detector 72, for decoding the signals received from the receiving units, to determine the distances of the digital pen from the individual receiving unit(s).

At the maximum likelihood detector 72, the acoustic signals received from the receiving units are compared to reference signals in a look-up table (LUT) 68.

The comparison indicates a most likely signal, and from the most likely signal, a distance is determined as the distance from which the signal was most likely transmitted.

The maximum likelihood detector 72 preferably uses a full mathematical signal model 77 of the channel, against which to compare received signals, so that a best match distance can be found.

As an alternative, the expected waveform can be sampled at the Nyquist rate, and any timing mismatch between the sampling points can be overcome by extrapolation functions, to reveal the distance.

Reference is now made to FIG. 16, which is a simplified block diagram illustrating exemplary components of a mathematical model for incorporating into a maximum likelihood detector, according to a preferred embodiment of the present invention.

The model 20 comprises an initial signal sequence S(t), generated in the signal generator, which is fed into the transfer function of the acoustic transmitter 26 with its filter 25. The digital pen 14 is followed by the channel 27. The result is then fed to the reception path in the receiver which includes transfer function 29 for the ultrasound receiver, and filtering 30.

The full modeling of the channel is useful in the design of the maximum likelihood detector 72, in that it allows accurate expected signals to be constructed against which the received acoustic signals, ideally, differ only in phase.

The detector (estimator) 70 is then relatively easily able to distinguish the most likely signal, which in turn corresponds to the most likely distance of the digital pen from the receiving unit.

Preferably, the infrared (IR) signal transmitted from the IR transmitters, spread on the face of the digital pen, are used to set the start of the delay, and also to synchronize clocks between the digital pen and the receivers.

In FIG. 15, synchronization path 76 is also indicated on the model.

A skilled person will appreciate that acoustic signals have differing angular transfer functions. An equalizer may be used in order to compensate for this fact.

The skilled person will appreciate that, instead of a model, a look-up table may be used. Furthermore, other detectors may be used, and there are several known decoders of FM signals, such as PLL (An electronic circuit that consists of a phase detector, low pass filter and voltage-controlled oscillator), I/Q demodulation, phase multiplication etc.

Reference is briefly made to FIG. 17, which is a two-part graph showing an exemplary correlation function, according to a preferred embodiment of the present invention.

The top part 1710 of the graph shows the function, and the lower part 1720 of the graph is an enlarged or zoomed view of the upper central part of the graph.

It is expected that during the life of this patent many relevant devices and systems will be developed and the scope of the terms herein, particularly of the terms "Digital", "Pen", "Acoustic transmitter", "Ultrasound transducer", "Microphone", and "Processor" is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A digital pen comprising: an electric circuit; an acoustic transmitter, detached from said electric circuit, and configured to transmit acoustic signals; and a resilient holder, configured to mechanically press said electric circuit into electrical contact with said acoustic transmitter upon application of mechanical pressure applied on said resilient holder to a pen body by a pen housing, said resilient holder having elasticity to enable easy assembly of said digital pen by sliding the resilient holder into position, extensions rising perpendicularly from either side of said resilient holder to secure said resilient holder to said pen body so as to electrically connect said electric circuit and said acoustic transmitter.

2. The digital pen of claim 1, wherein said resilient holder further comprises a base, said extensions arising perpendicularly from said base, said resilient holder being configured for location of a first electrical circuit and a second electrical circuit thereon within the confines of said pen housing, and such as to bring about an electrical contact between said first and second electrical circuits due to said confinement within said housing.

3. The digital pen of claim 1, wherein said acoustic transmitter is an ultrasound transducer.

4. The digital pen of claim 1, wherein said resilient holder is electrically conductive.

5. The digital pen of claim 2, wherein said extensions impart a U shape to said resilient holder.

6. The digital pen of claim 1, wherein said pen housing is configured to apply mechanical pressure on said resilient holder, thereby to bring about said electrical contact.

7. The digital pen of claim 6, wherein said pen housing comprises a changeable cover element.

8. The digital pen of claim 1, further comprising a plurality of infrared emitters, deployed on a plurality of positions on the digital pen, for emitting infrared light.

9. The digital pen of claim 1, further comprising: a switch assembly having two switching points for pressing said switch assembly to achieve first and second switching modes respectively, the switch assembly further having a third mode selectable upon said two switching points being pressed substantially simultaneously.

10. The digital pen of claim 9, wherein said switch assembly comprises a switching rod balanced about a fulcrum, wherein said fulcrum is resiliently configured to retain said switching rod at either one of a higher levered position and a lower received position and wherein said two switching points being pressed substantially simultaneously has the effect of lowering said lever into said received position.

11. The digital pen of claim 1, further comprising:

a pen tip located in proximity to said acoustic transmitter; and a smooth contact switch, configured to smoothly actuate the digital pen upon transmission thereto of a writing pressure from said pen tip.

12. The digital pen of claim 11, wherein said smooth contact switch comprises a resilient element, mounted on a first side of an open electric circuit, and disconnected from a second side of said open electric circuit, said resilient element being compressible into a position where said resilient element contacts said second side of said open electric circuit, thereby closing said open electric circuit, upon applying said writing pressure compressing said resilient element into said position.

13. The apparatus of claim 12, wherein said resilient element further comprises a conductive additive, for making said resilient element electrically conductive, or is made of an electrically conductive material, or is glued to said open electric circuit.

14. The digital pen of claim 11, wherein said writing pressure is lower than 25 grams, or wherein said writing pressure compresses said resilient element along a distance of less than 0.1 mm, or wherein said writing pressure on said smooth contact switch is generated upon the digital pen touching a surface.

15. The digital pen of claim 1, further comprising:

an elongated body terminating in a writing tip; a writing element protruding from said writing tip; said acoustic transmitter being deployed adjacent to said writing tip; and a rotating cover, adjacently mounted to said writing tip, covering said writing element upon being rotated in one direction, and exposing said writing element upon being rotated in a direction opposite to said one direction.

16. The digital pen of claim 1, further comprising:

an elongated body terminating in a writing tip; a writing element protruding from said writing tip, said acoustic transmitter deployed adjacent to said writing tip; and an elongated housing covering said elongated body, said elongated body being movable inside said elongated housing for exposing and for covering said writing element.

17. The digital pen of claim 16, further comprising a spring urging said elongated body into a position where said writing element is covered by said elongated housing, and a means for securing said elongated body into a position where said writing element is exposed.

18. The digital pen of claim 1, further comprising two acoustic signal transmitters, each acoustic signal transmitter being configured to transmit an acoustic signal, and positioned respectively apart on the digital pen.

19. The digital pen of claim 1, further comprising: an acoustic wave guide, positioned adjacent to said acoustic transmitter, said acoustic wave guide comprising a plurality of fins radiating outwardly in a direction away from said acoustic transmitter, said fins being positions so as to guide said acoustic signals.

20. The digital pen of claim 19, wherein said fins are positioned so as to spatially divide the region about said acoustic transmitter into a plurality of directional sectors, so as to substantially isolate first acoustic signals transmitted by said acoustic transmitter through one of said sectors from second acoustic signals transmitted from said acoustic transmitter through remaining ones of said sectors.

21. A digital pen system comprising:

a digital pen comprising a first electric circuit; an acoustic transmitter, detached from said first electric circuit~ and configured to transmit acoustic signals; and a resilient holder, configured to mechanically press said first electric circuit into electrical contact with said acoustic transmitter upon application of mechanical pressure applied on said resilient holder to a pen body by a pen housing, said resilient holder having elasticity to enable easy assembly of said digital pen by sliding the resilient holder into position, extensions rising perpendicularly from either side of said resilient holder to secure said resilient holder to said pen body so as to electrically connect said electric circuit and said acoustic transmitter; and a receiving unit for receiving the acoustic signals from the digital pen, comprising at least two ultrasound receivers, for receiving the acoustic signals from the digital pen; and a second electric circuit connected to said ultrasound receivers, and configured to extract the acoustic signals received by said ultrasound receivers, said extraction comprises referencing a reference model comprising data pertaining to expected reference signals.

22. The system of claim 21, wherein said ultrasound receivers are at least one of the group consisting of electret microphones and MEMS microphones.

23. The system of claim 21, further comprising at least one attachment device, for removably attaching the receiving unit to another item.

24. The system of claim 21, wherein said at least two ultrasound receivers are positioned less than 65 mm apart from each other.

25. The system of claim 21, wherein said receiving unit further comprises a receiver housing, configured to house said ultrasound receivers and having a changeable cover element.

26. A digital pen system comprising: a digital pen having an electric circuit, an acoustic transmitter configured to transmit acoustic signals, detached from said electric circuit, and a resilient holder, configured to press said electric circuit into contact with said acoustic transmitter upon applying a mechanical pressure to said resilient holder, said mechanical pressure on said resilient holder being further applied to a pen body by a pen housing, said resilient holder having elasticity to enable easy assembly of said digital pen by sliding the resilient holder into position, extensions rising perpendicularly from either side of said resilient holder to secure said resilient holder to said pen body so as to electrically connect said electric circuit and said acoustic transmitter; at least one receiving unit for receiving said acoustic signals from said digital pen; and a processor, associated with said at least one receiving unit, configured to process said received acoustic signals for determining a location of said digital pen.

27. The system of claim 26, further comprising a map, configured to graphically map a predefined area, so as to assist a user in positioning the digital pen in said predefined area.

28. The digital pen system of claim 26, wherein said digital pen further comprises:

a switch assembly having two switching points for pressing said switch assembly to achieve first and second switching modes respectively, said switch assembly further having a third mode selectable upon said two switching points being pressed substantially simultaneously.

29. The digital pen system of claim 26, further comprising a smooth contact switch configured to actuate the digital pen upon applying a pressure on said smooth contact switch; said smooth contact switch comprises a resilient element, mounted on a first side of an open electric circuit and disconnected from a second side of said open electric circuit, said resilient element being compressible into a position where said resilient element contacts said second side of said open electric circuit, thereby closing said open electric circuit, upon applying a writing pressure compressing said resilient element into said position.

30. The digital pen system of claim 26, wherein said determining said location comprises referencing a reference model comprising data pertaining to expected reference signals.

31. The digital pen system of claim 30, further comprising at least one attachment device, for removably attaching said at least one receiving unit to another item.

32. The digital pen system of claim 26, wherein said at least one receiving unit comprises a receiver housing, and at least two acoustic signal receivers positioned inside said housing, and configured to receive said acoustic signals from said digital pen; the at least one receiving unit having a securing plate mounted thereon, wherein the securing plate is configured to fit a substantially right angled corner, for securing the at least one receiving unit to the right angle corner.

33. The digital pen system of claim 32, wherein said receiver housing comprises a changeable cover element.

34. The digital pen of claim 1, further comprising a smooth contact switch, the smooth contact switch comprising a resilient element, mounted on a first side of an open electric circuit and disconnected from a second side of said open electric circuit, said resilient element being smoothly compressible into a position where said resilient element contacts said second side of said open electric circuit, thereby smoothly closing said open electric circuit, upon applying pressure smoothly compressing said resilient element into said position.

35. The digital pen of claim 34, wherein said resilient element comprises a conductive additive, for making said resilient element electrically conductive, or wherein said resilient element comprises an electrically conductive material, or wherein said resilient element is glued to said open electric circuit.

36. The digital pen of claim 34, wherein said pressure is lower than 25 grams, or wherein said pressure compresses said resilient element along a distance of less than 0.1 mm.

37. The digital pen of claim 1, further comprising a digital sleeve, mountable on a writing instrument, the digital sleeve comprising a writing sensor, connected to said acoustic transmitter, configured to detect a predefined movement of the writing instrument in relation to the digital sleeve and to actuate said acoustic transmitter upon said detection.

38. The digital pen system of claim 32, wherein said securing plate is further configured to fit a middle position on a paper sheet, for securing the at least one receiving unit to said middle position.

39. The digital pen system of claim 32, wherein said substantially right angled corner is a corner of a paper sheet.

* * * * *